United States Patent [19]

Inaji et al.

[11] Patent Number: 5,182,499
[45] Date of Patent: Jan. 26, 1993

[54] SENSORLESS BRUSHLESS MOTOR

[75] Inventors: Toshio Inaji, Minoo; Makoto Gotou, Nishinomiya, both of Japan

[73] Assignee: Matsushita Electric Industrial Co., Ltd., Osaka, Japan

[21] Appl. No.: 780,302

[22] Filed: Oct. 22, 1991

[30] Foreign Application Priority Data

Oct. 25, 1990 [JP] Japan .................. 2-289129
Oct. 29, 1990 [JP] Japan .................. 2-292260

[51] Int. Cl.$^5$ .............................................. H02P 6/02
[52] U.S. Cl. ...................................... 318/254; 318/138
[58] Field of Search .................... 318/138, 254, 439

[56] References Cited

U.S. PATENT DOCUMENTS

| | | | |
|---|---|---|---|
| 4,162,435 | 7/1979 | Wright | 318/138 |
| 4,712,050 | 12/1987 | Nagasawa et al. | 318/254 |
| 4,912,378 | 3/1990 | Vukosavic | 318/254 |
| 4,922,169 | 5/1990 | Freeman | 318/254 |
| 4,928,043 | 5/1990 | Plunkett | 318/254 |
| 5,019,756 | 5/1991 | Schwarz | 318/254 |
| 5,057,753 | 10/1991 | Leuthold et al. | 318/254 |
| 5,095,254 | 3/1992 | Ueki | 318/138 |

FOREIGN PATENT DOCUMENTS 62-260586 11/1987 Japan .
1-122388 5/1989 Japan .

Primary Examiner—Bentsu Ro
Attorney, Agent, or Firm—Wenderoth, Lind & Ponack

[57] ABSTRACT

In a sensorless brushless motor which does not have a position sensor for detecting a rotational position of a rotor, the rotational position thereof is detected by detecting the zero-crossing points of the counter electromotive forces induced in the stator windings of the rotor. A shaping signal obtained by detecting the zero-crossing point of each of the counter electromotive forces and a slant waveform signal generated in response to the shaping signal thus obtained are combined to form a trapezoidal waveform position signal, and an electric current of a trapezoidal waveform is supplied in response to the position signal thus obtained to the corresponding one of the stator windings, so that the electric current commutation of the stator windings can be performed smoothly. As a result, the motor can be practically driven with reduced vibration and noise generation.

18 Claims, 16 Drawing Sheets

SENSORLESS BRUSHLESS MOTOR

BACKGROUND OF THE INVENTION

1. Field of the Invention

This invention relates to a brushless DC motor. More particularly, it relates to a brushless DC motor which does not have a position sensor for detecting a rotational position of a permanent magnet rotor.

2. Description of the Prior Art

Recently, brushless DC motors have been widely used in industrial audio and video equipment requiring higher reliability for the reasons that service life can be improved as well as noise generation can be reduced resulting from such an advantage that they do not need to have a mechanical contact as would be used in conventional DC motors having brushes.

In order to perform the commutating operation of a conducting phase of the stator windings of a motor, most of conventional brushless DC motors use a rotor position sensor (such as, for example, a Hall effect sensor) instead of using brushes. However, the rotor position sensor itself is not so cheap and requires sophisticated positional adjustment for setting and an increased amount of wiring, so that the cost of the brushless DC motor is disadvantageously high as compared with DC motors having brushes.

In addition, some structural limitations will be frequently imposed thereupon for the reason that a rotor position sensor has to be set inside the motor itself. A recent trend is that accompanied with the minaturization of industrial audio and video equipment, motors to be used therein are made small in size and thickness, which means that the sectional space where a rotor position sensor such as a Hall effect sensor or the like is to be provided becomes extremely small. Under such a circumstance, several types of brushless DC motor having no position sensor such as, for example, a Hall effect sensor have been proposed previously.

Out of which, a brushless DC motor disclosed, for example, in Japanese Laid-Open Patent Application Laid-Open No. 55-160980 is based on the so-called half wave driving method in which an electric current is supplied unidirectionally to the stator windings of the rotor. With this method, counter electromotive forces induced in two stationary stator windings being out of three-phase stator windings are detected, and the signals thus detected are operationally processed to determine the next conducting phase so as to thereby supply an electric current unidirectionally to the stator windings in a successive manner.

Also, disclosed, for example, in Japanese Patent Application Laid-Open No. 62-260586 is a brushless DC motor which is based on the so-called full wave driving method in which an electric current is supplied bidirectionally to the stator windings of the rotor. With this method, the zero-crossing points of the counter electromotive forces induced in the stator windings of the rotor accompanied with the rotation of the motor are detected so as to thereby delay its output signal by a constant period of time by a monostable multi-vibrator; thus, the timing of conducting an electric current is determined.

The former brushless DC motor of the prior art described above (Laid-Open Patent Application No. 55-160980) is based on the so-called half wave driving method in which an electric current is supplied unidirectionally to the stator windings of the rotor, so that its driving circuit can be made simple in structure on the one hand, but on the other hand, the utility and efficiency of the stator windings are low as compared with a brushless DC motor based on the full wave driving method in which an electric current is supplied bidirectionally to the stator windings of the rotor so that a torque to be developed becomes small.

On the other hand, the latter brushless DC motor of the prior art described above (Laid-Open Patent Application No. 62-260586) is based on the method in which the conducting phase is determined by delaying a pulse signal generated at the zero-crossing point of a counter electromotive force induced in each of the stator windings by a constant period of time through a monostable multi-vibrator, so that the delay time is constant independently of the rotational speed of the motor, which, means that it is not stable for an application where the rotational speed has to be changed, thus lacking in its flexibility of application.

In both brushless DC motors according to the prior art described above, an electric current flowing to the stator windings of the rotor is a rectangular waveform signal with a conducting width of about 120° in terms of electrical angle. As a result, in order to reduce an induced spike voltage accompanied with the phase-commutation, a filter circuit including a comparatively large capacitor is particularly required to be provided at a conducting terminal of the stator windings. Also, an electric current flowing to the stator windings is subjected to an ON-OFF operation in an abrupt manner, so that such a problem has further arisen in that vibration and noise can be easily generated when starting the rotation and this trend is accelerated as the relational speed of the motor is increased.

SUMMARY OF THE INVENTION

In consideration of the above-mentioned problems, an object of this invention is to provide a brushless DC motor which does not have a position sensor.

Another object of this invention is to provide a brushless DC motor of the full wave driving method in which an electric current can be supplied bidirectionally to each of the stator windings thereof.

A further object of this invention is to provide a brushless DC motor whose rotational speed can be changed optionally.

Still a further object of this invention is to provide a brushless DC motor which does not need to have a filter circuit including a large capacitor as would be necessary to be used in a brushless DC motor according to the prior art as shown above and yet which has its vibration and noise generation significantly reduced even when rotating at a high speed.

In order to attain the above-mentioned objects, a brushless DC motor of this invention comprises: 3-phase stator windings; a first driving transistors group consisting of three transistors, which forms an electric current loop between one terminal of a DC power source and electric current receiving terminals of the 3-phase stator windings; a second driving transistors group consisting of three transistors, which forms an electric loop between another terminal of the DC power source and the electric current receiving terminals of the 3-phase stator windings, a counter electromotive force detecting circuit for generating a shaping timing signal in response to counter electromotive forces respectively induced in the stator windings; a logical pulse generating circuit for generating a plurality of pulse signals in response to the shaping timing signal; a waveform generating circuit for generating slant waveform signals whose slants are started from or substantially from the edge points of the shaping timing signal; a signal forming circuit for generating 6-phase formed signals from the slant waveform signals, which have the rising slant portions and falling slant portions started from or substantially from the edge points of the shaping timing signal, and a signal preparing circuit for preparing 6-phase position signals of a trapezoidal waveform respectively in response to the 6-phase formed signals. The first driving transistors group is controllably caused to in response to 3-phase position signals out of the 6-phase position signals and the second transistors group is controllably caused to in response to the other 3-phase position signals out of the 6-phase position signals.

In addition, in order to attain the above-mentioned objects, a brushless DC motor of this invention comprises: 3-phase stator windings; a first driving transistors group consisting of three transistors, which forms an electric current loop between one terminal of a DC power source and electric current receiving terminals of the stator windings; a second driving transistors group consisting of three transistors, which forms an electric current loop between another terminal of the DC power source and the electric current receiving terminals of the stator windings; a counter electromotive force detecting circuit for generating a shaping signal in response to counter electromotive forces respectively induced in the stator windings; a logical pulse generating circuit for generating a plurality of pulse signals in response to the shaping signal; a first slant waveform generating circuit for generating a first slant waveform signal in response to the shaping signal; a second slant waveform generating circuit for generating a second slant waveform signal at a different timing from the first slant waveform signal in response to the shaping signal; a first formed signal preparing circuit for generating first 3-phase formed signals from the pulse signals of the logical pulse generating circuit and the first slant waveform signal of the first slant waveform generating circuit, which have the rising slant portions and falling slant portions started at or substantially at the same timing as that of the first slant waveform signal; a second formed signal preparing circuit for generating second 3-phase formed signals from the pulse signals of the logical pulse generating circuit and the second slant waveform signal of the second slant waveform generating circuit, which have the rising slant portions and falling slant portions started at or substantially at the same timing as that of the second slant waveform signal; a first position signal preparing circuit for preparing first 3-phase position signals of a trapezoidal waveform in response to the first formed signals, and a second position signal preparing circuit for preparing second 3-phase position signals of a trapezoidal waveform in response to the second formed signals. The first driving transistors group is controllably caused to conduct in response to the first position signals and the second driving transistors group is controllably caused to conduct in response to the second position signals.

With the arrangements as shown above, the brushless DC motor of this invention obtains a shaping signal in response to counter electromotive forces respectively induced in the stator windings, generates slant waveform signals (first slant waveform signal and second slant waveform signal) in response to the shaping signal thus obtained, forms 6-phase formed signals (first formed signals and second formed signals) which are smoothly changed using the slant waveform signals thus generated, and prepares 6-phase position signals (first position signals and second position signals) which are trapezoidal in waveform in response to the formed signals thus obtained. The position signals thus prepared controllably cause the first and second driving transistors groups, to conduct thus being capable of supplying smooth trapezoidal waveform electric currents bidirectionally to the stator windings of the rotor. As a result, the electric currents flowing to the stator windings are not turned ON or OFF abruptly as would occur in conventional motors, which means that the phase commutation of electric current loops can be made smoothly, resulting in the operation of the motor with a significantly reduced vibration and noise generation.

BRIEF DESCRIPTION OF THE DRAWINGS

FIG. 8 (b) is a diagram showing a signal waveform outputted from each member of the circuit shown in FIG. 7 when normally rotating at low speed.

DESCRIPTION OF THE PREFERRED EMBODIMENTS

Figure 1:
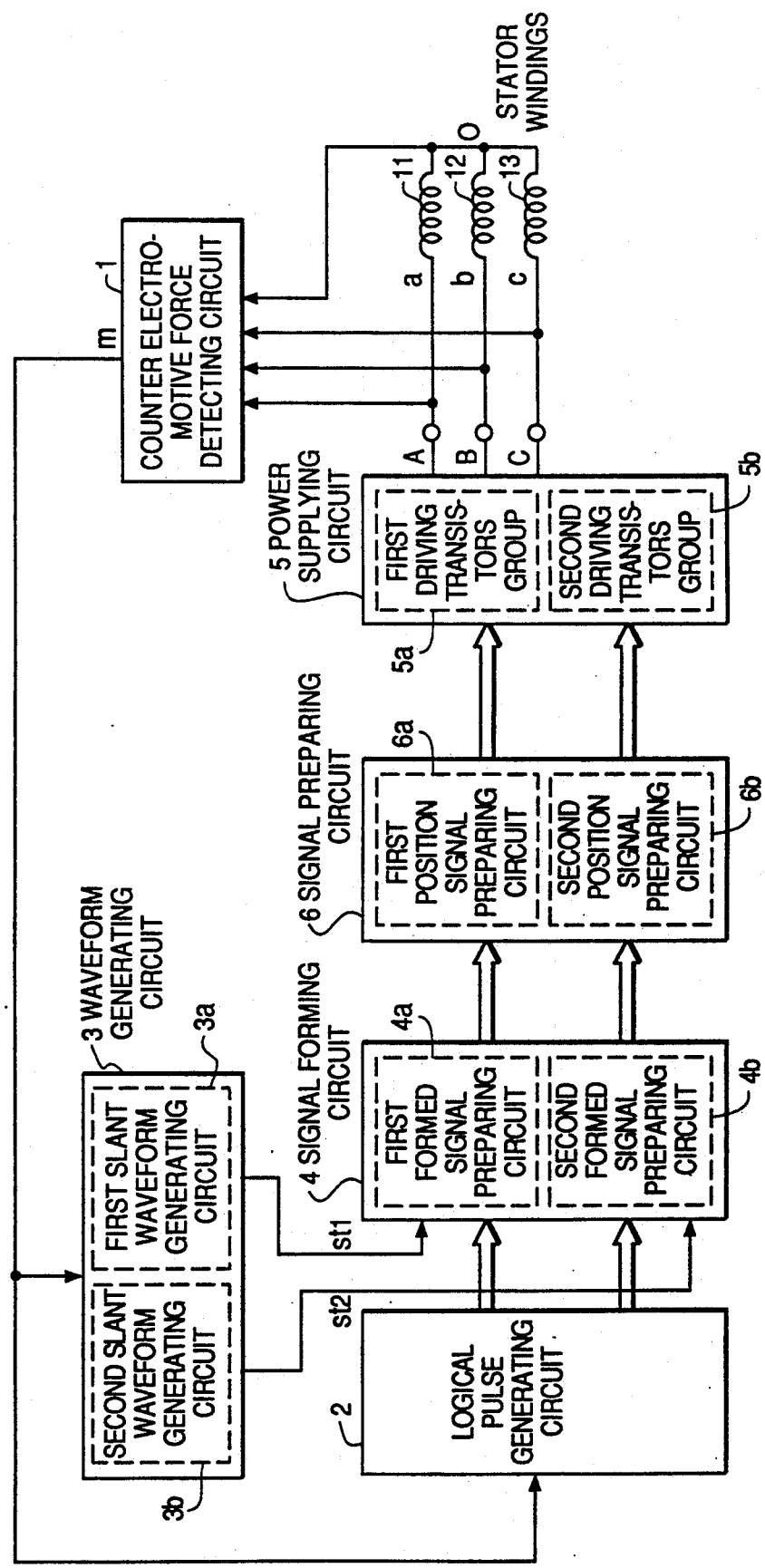
FIG. 1 is a block diagram of a sensorless brushless motor according to one embodiment of this invention.

Description will be made below on the preferred embodiments of this invention by referring to the drawings.

FIG. 1 is a block diagram of a sensorless brushless motor according to one embodiment of this invention. In FIG. 1, the reference numeral 1 indicates a counter electromotive force detecting circuit to receive counter electromotive forces a, b and c respectively induced in 3-phase stator windings 11, 12 and 13 and the neutral point 0 of the stator windings 11, 12 and 13. The counter electromotive force detecting circuit 1 detects respective zero-crossing points of the 3-phase electromotive forces a, b and c to convert them into a shaping timing signal m. The shaping timing signal m outputted from the counter electromotive force detecting circuit 1 is inputted to a logical pulse generating circuit 2 and a waveform generating circuit 3. The logical pulse generating circuit 2 frequency-divides the shaping timing signal m to output 6-phase pulse signals having the same frequency as that of the counter electromotive forces induced in the stator windings 11, 12 and 13. The waveform generating circuit 3 generates slant waveforms st1 and st2 in response to the shaping timing signal m. The 6-phase pulse signals generated in the logical pulse generating circuit 2 are inputted to a signal forming circuit 4 to form 6-phase trapezoidal waveform signals from the slant waveform signals st1 and st2 outputted from the waveform generating circuit 3 and the 6-phase signals outputted from the logical pulse generating circuit 2. The 6-phase formed signals of a trapezoidal waveform formed by the signal forming circuit 4 are inputted to a signal preparing circuit 6 to be converted into position signals of the rotor. The position signals thus obtained are sent to a power supplying circuit 5. The power supplying circuit 5 supplies an electric current bidirectionally to each of the stator windings 11, 12 and 13 in a successive manner respectively in response to the position signals thus sent.

With the structure as shown above, the operation of the brushless DC motor of this embodiment will be explained below.

Figure 2:
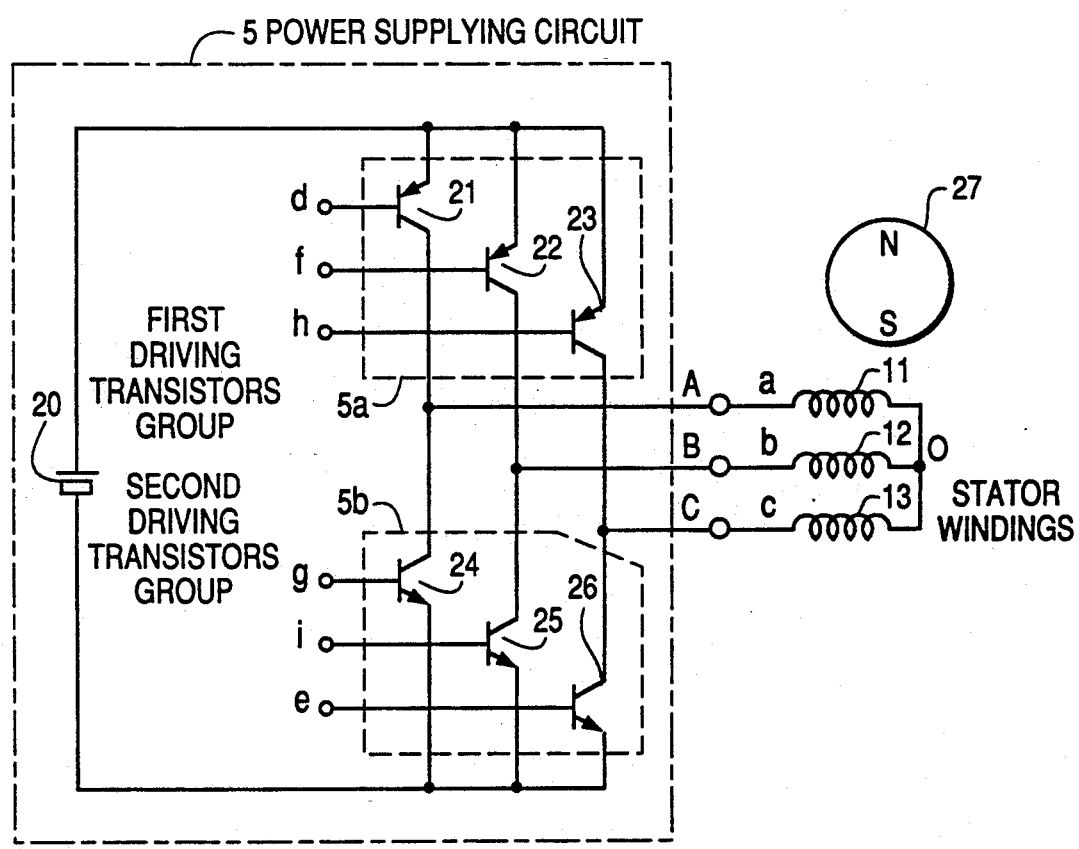
FIG. 2 is a circuit diagram of a power supplying circuit showing an example of that shown in FIG. 1.

FIG. 2 is a circuit diagram of a power supplying circuit showing an example of the power supplying circuit 5 shown in FIG. 1.

In FIG. 2, element 27 is a permanent magnetic rotor, elements 11, 12 and 13 are stator windings; element 5a is a first driving transistors group element 5b is a second driving transistors group and element 20 is a DC power source. The first driving transistors group 5a comprises three PNP driving transistors 21, 22 and 23. The three PNP driving transistors 21, 22 and 23 each forms an electric current loop between the positive-side terminal of the DC power source 20 and the corresponding one of the electric current receiving terminals A, B and C of the stator windings 11, 12 and 13. In addition, the second driving transistor group 5b comprises three NPN transistors 24, 25 and 26, each forming an electric current loop between the negative-side terminal of the DC power source 20 and the corresponding one of the electric current receiving terminals A, B and C of the stator windings.

To the bases of the driving transistors 21, 22 and 23, the first 3-phase position signals d, f and h prepared by the first position signal preparing circuit 6a of the signal preparing circuit 6 are respectively supplied to control the conduction of electric currents to the driving transistors 21, 22 and 23. Similarly, to the bases of the driving transistors 24, 25 and 26, the second 3-phase position signals g, i and e prepared by the second signal preparing circuit 6b are respectively supplied to control the conduction of electric currents to the driving transistors 24, 25 and 26. In this case, however, the PNP transistors 21, 22 and 23 each is supplied with the signal to its base in the direction that an electric current is to be taken out and on the other hand, the NPN driving transistors 24, 25 and 26 each is supplied with a signal to its base in the direction that it is to be taken in. The signals are supplied such that the permanent magnetic rotor 27 is driven to be rotated.

The signal waveform of each member of the power supplying circuit 6 will be explained in detail by referring to FIGS. 13 and 14.

Figure 3:
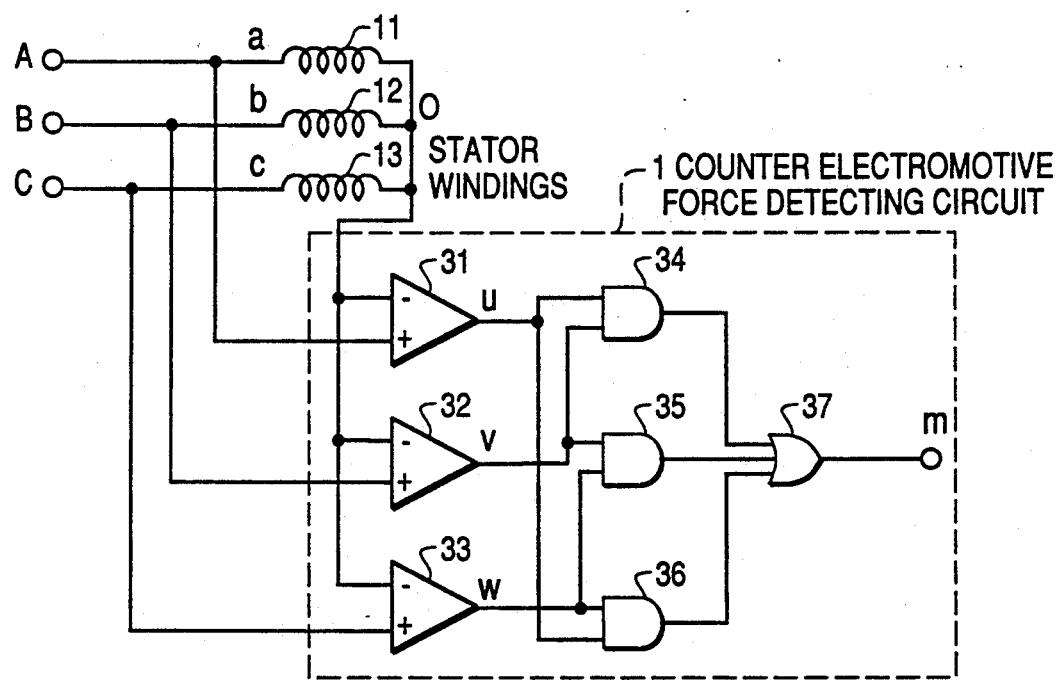
FIG. 3 is a circuit diagram of a counter electromotive force detecting circuit showing an example of that shown in FIG. 1.
Figure 4:
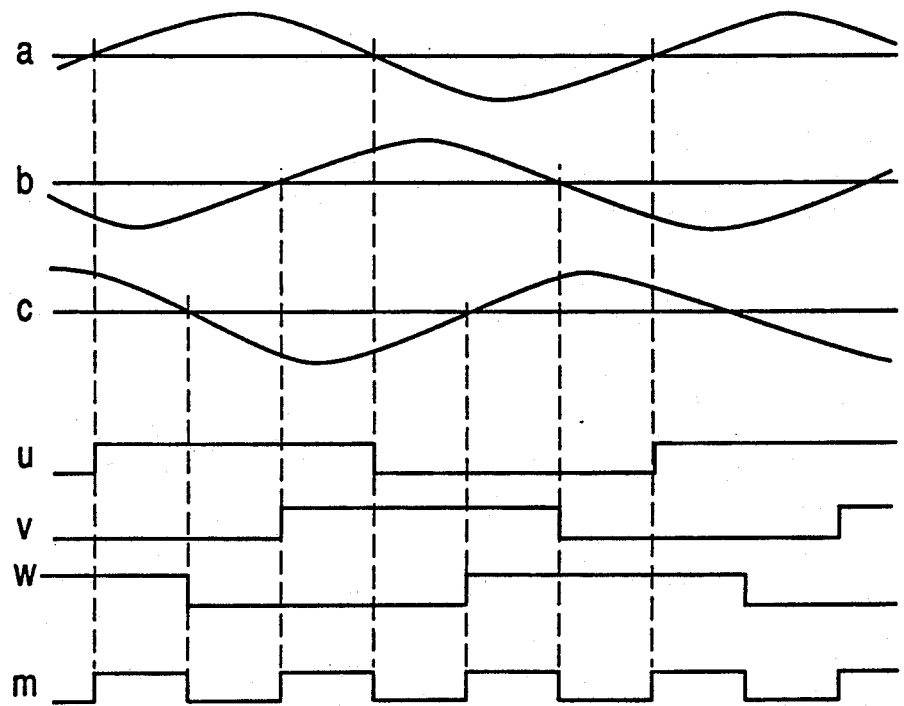
FIG. 4 is a diagram showing a signal waveform outputted from each member of the circuit shown in FIG. 3.

FIG. 3 is a circuit diagram of a counter electromotive force detecting circuit showing an example of the circuit 1 shown in FIG. 1 and FIG. 4 is a diagram showing a signal waveform outputted from each member of the circuit shown in FIG. 3 when the motor is being rotated normally.

In FIG. 3, element 31, 32 and 33 are comparator each having one terminal (+) which is connected to a corresponding one, of the stator windings 11, 12 and 13 and whose other each having another terminal (−) which is connected to the neutral point O of the stator windings 11, 12 and 13. Also, elements 34, 35 and 36 are AND circuits. The AND circuits 34, 35 and 36 respectively have their input terminals connected to the output terminals of the comparators 31 and 32, the comparators 32 and 33 and the comparators 33 and 31. In addition, element 37 is an OR circuit to be supplied with each of outputs from the AND circuits 34, 35 and 36, thereby outputting an OR output signal m.

The operation of the counter electromotive force detecting circuit 1 shown in FIG. 3 will be explained below by referring to FIG. 4. When the motor is rotating normally, 3-phase counter electromotive forces a, b and c shown in FIG. 4 are induced respectively in the stator windings 11, 12 and 13. Double and voltages of the stator windings 11, 12 and 13 are inputted respectively to the input terminals of the comparators 31, 32 and 33 to obtain 3-phase shaping signals u, v and w to be changed at the respective points where the double end voltages become zero. The double end voltage of a stator winding is defined as a voltage obtained by combining an electric current flowing in the stator winding, a voltage drop due to winding resistance and an induced counter electromotive force. The electric current flowing in the stator winding becomes zero at the zero-crossing point of the counter electromotive force, so that the edges of the 3-phase shaping signals u, v and w respectively to the zero-crossing points of the counter electromotive forces a, b and c. The shaping signals u, v and w are logically combined through the AND circuits 34, 35 and 36 and the OR circuit 37 so as to thereby obtain the shaping timing signal m as shown in FIG. 4. The rising edge of the shaping timing signal m corresponds to the zero-crossing point on the rising side of each of the counter electromotive forces a, b and c, and on the other hand, the falling edge thereof corresponds to the zero-crossing on the falling side of each of them the counter electromotive forces a, b, and c.

Figure 5:
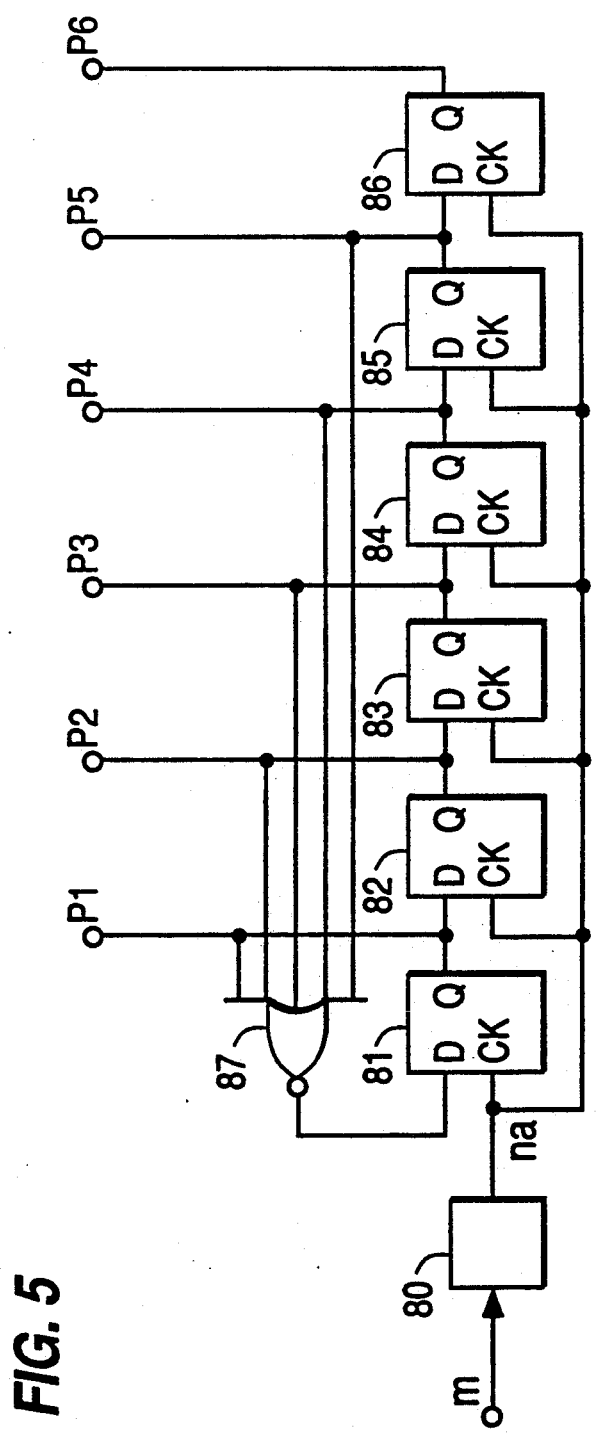
FIG. 5 is a circuit diagram of a logical pulse generating circuit showing an example of that shown in FIG. 1.
Figure 6:
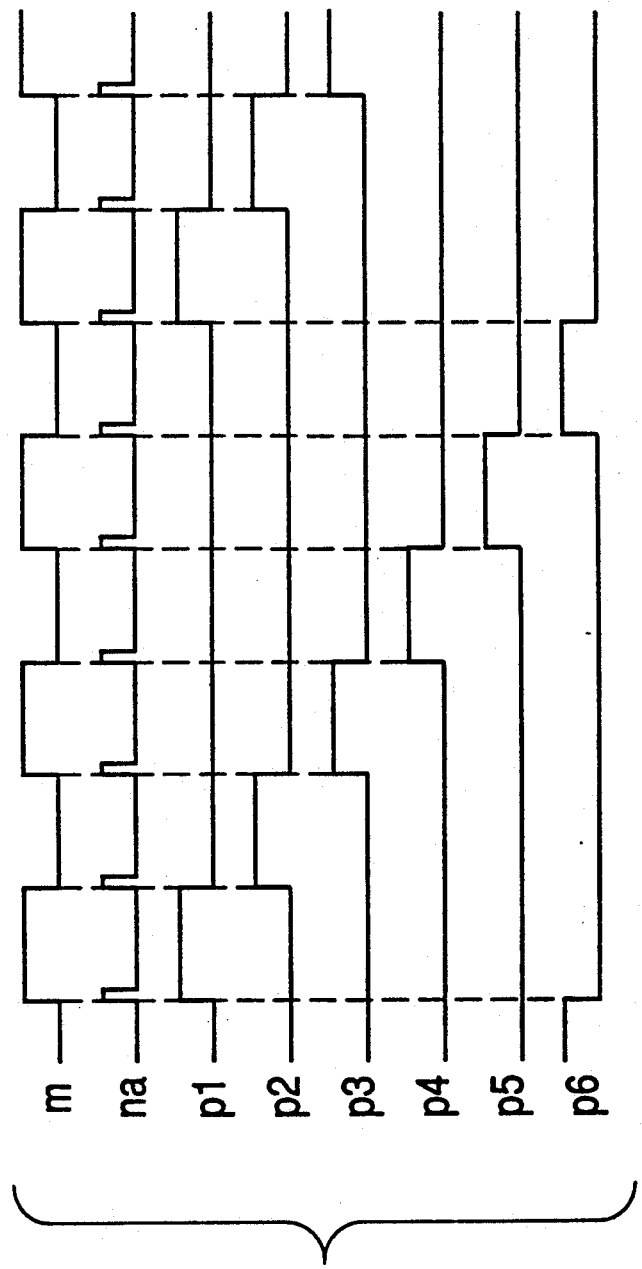
FIG. 6 is a diagram showing a signal waveform outputted from each member of the circuit shown in FIG. 5.

FIG. 5 is a circuit diagram of a logical pulse generating circuit showing an example of the circuit 2 shown in FIG. 1, and FIG. 6 is a diagram showing a signal waveform outputted from each member of the circuit shown in FIG. 5.

In FIG. 5, the shaping timing signal m is sent to a both edge differentiation circuit 80 to obtain a differentiation pulse signal na at timings of the both edges of the shaping timing signal m (FIG. 6; m, na). The differentiation pulse signal na becomes clock pulse signals through a 6-bit shift register consisting of D-type flip-flop circuits 81, 82, 83, 84, 85 and 86 and a NOR circuit 87. At every time when the differentiation signal na is generated, the "H" (high level) state is shifted successively, so that 6-phase logical pulses p1, p2, p3, p4, p5 and p6 as shown in FIG. 6 can be generated. The edge of each of the logical pulses p1, p2, p3, p4, p5 and p6 corresponds to each edge of the shaping timing signal m and to the zero-crossing point of each of the counter electromotive forces a, b and c. FIG. 6 shows the phase relation between the shaping timing signal m and the logical pulse signals p1, p2, p3, p4, p5 and p6 when the motor is rotating normally.

Next, the operation of the slant waveform generating circuit 3 shown in FIG. 1 will be explained in detail below.

Figure 7:
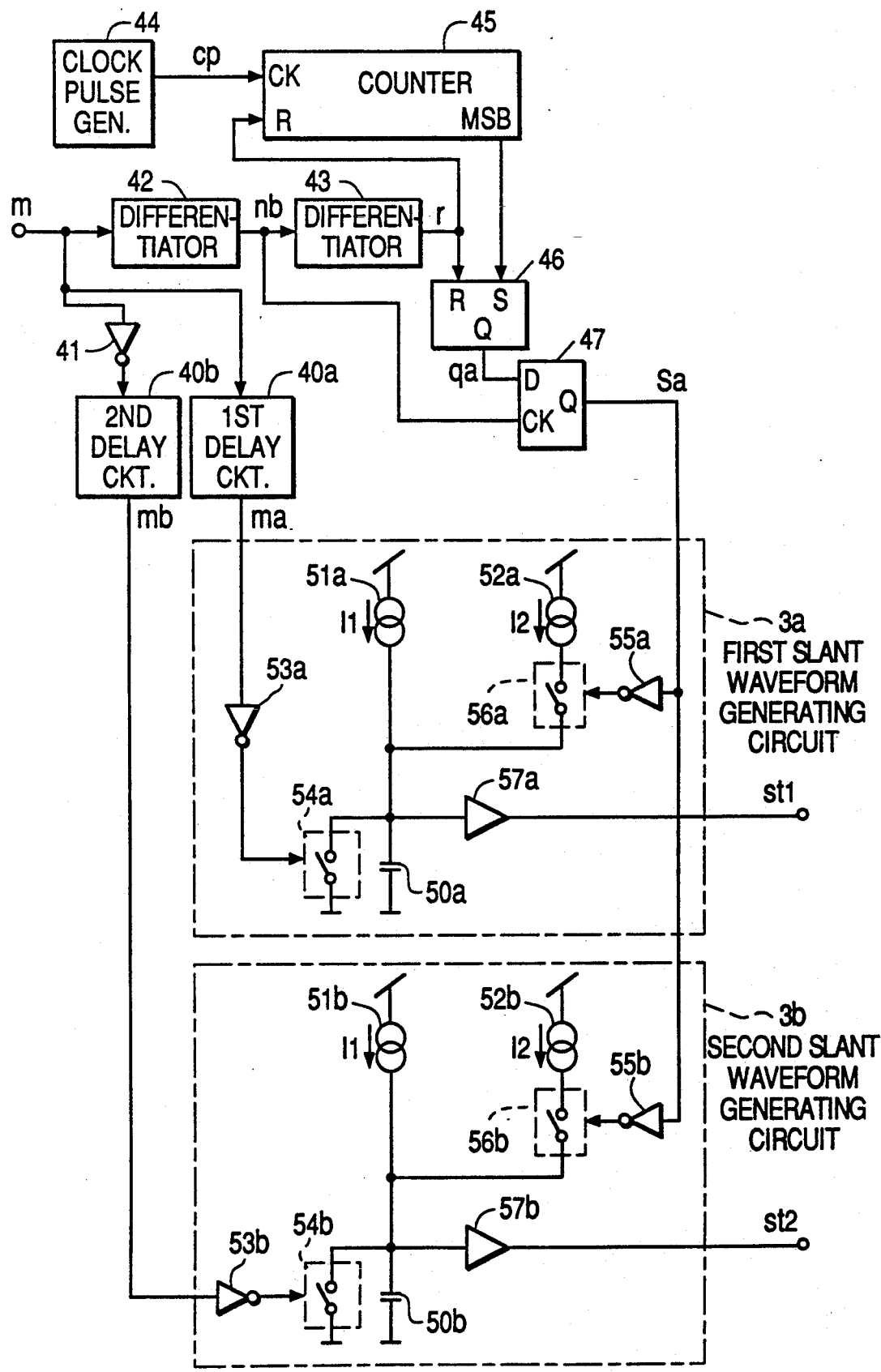
FIG. 7 is a circuit diagram of a waveform generating circuit showing an example of that shown in FIG. 1.
Figure 8A:
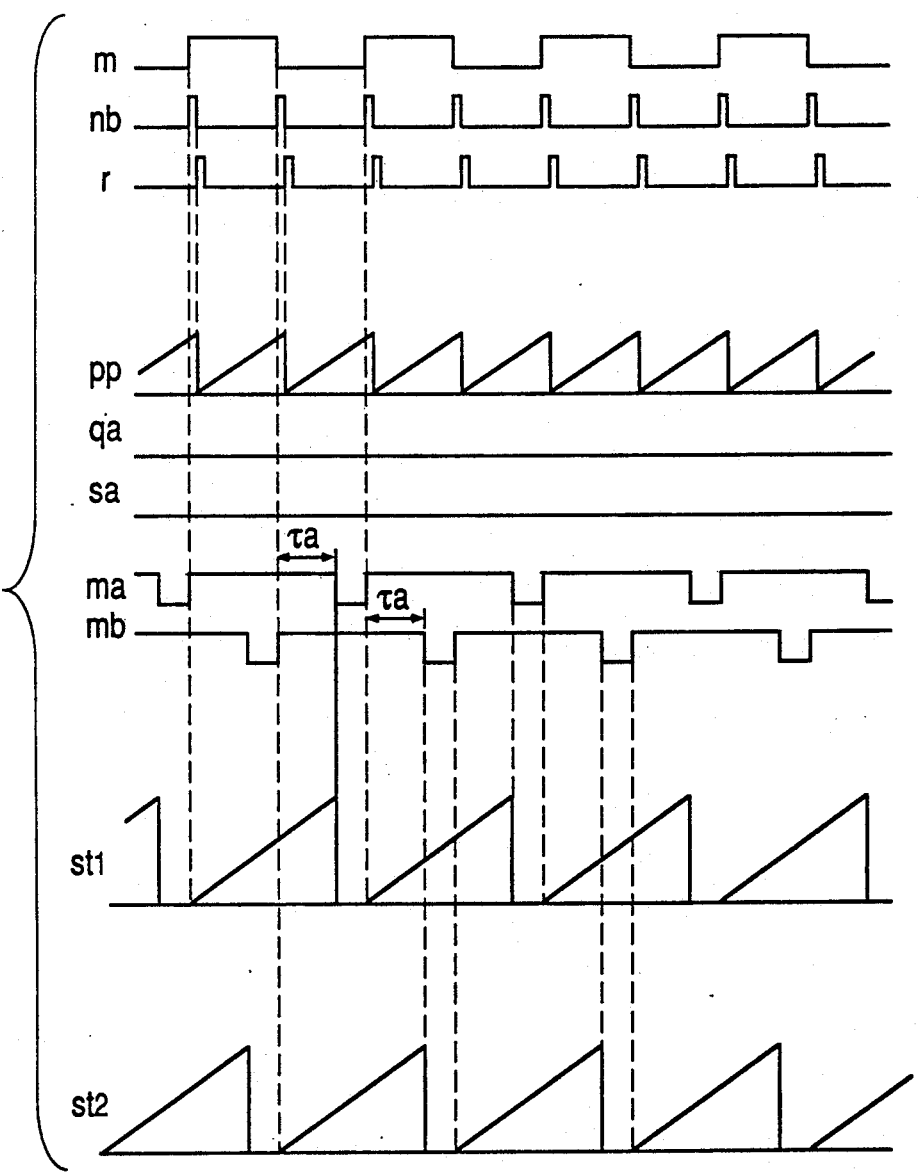
FIG. 8 (a) is a diagram showing a signal waveform outputted from each member of the circuit shown in FIG. 7 when normally rotating at high speed.
Figure 8B:
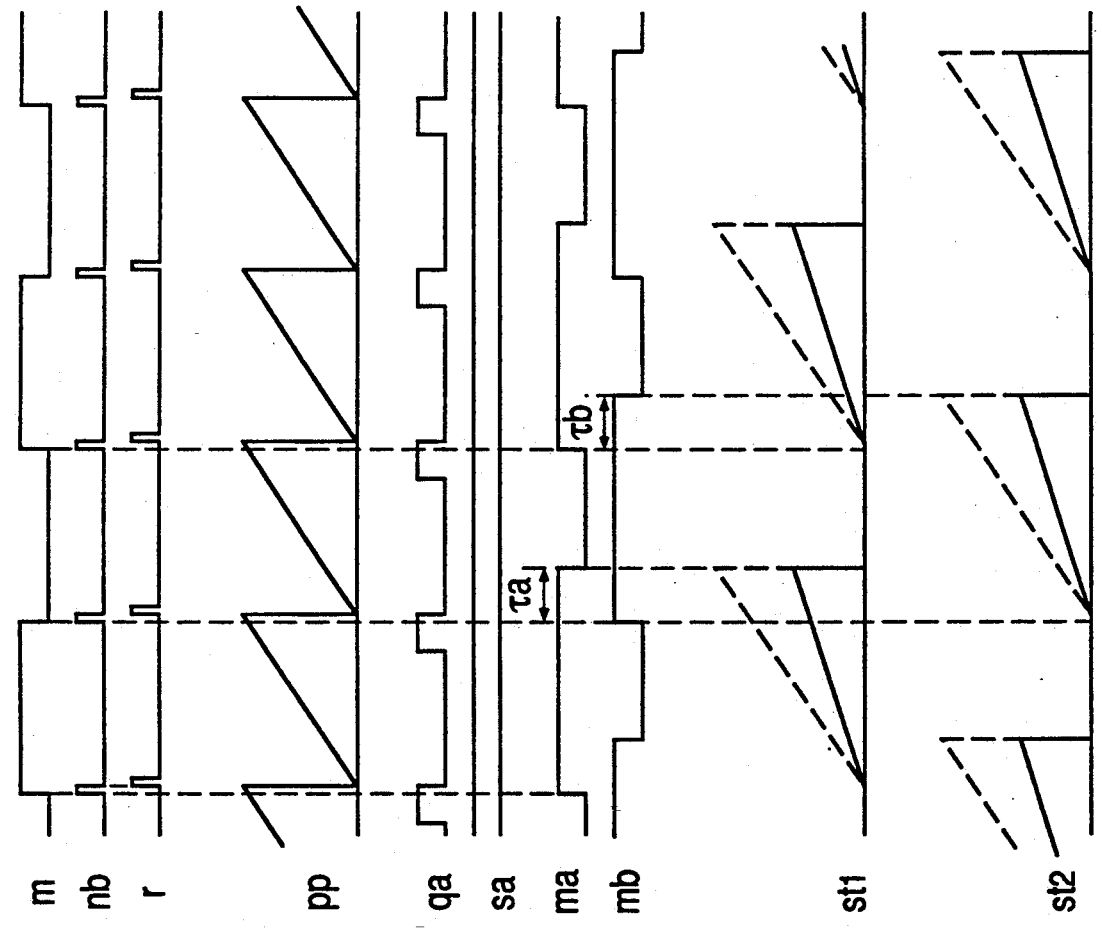

FIG. 7 is a circuit diagram of a slant waveform generating circuit showing an example of the circuit 3 shown in FIG. 1, FIG. 8 (a) is a diagram showing a signal waveform outputted from each member of the circuit shown in FIG. 7 when the motor is being normally rotated at high speed and FIG. 8 (b) a diagram showing a signal waveform outputted from each member of the circuit shown in FIG. 7 when being normally rotated at low speed.

In FIG. 7, element 42 is a differentiation circuit for generating a differentiation pulse signal nb at timings of the both edges of the shaping timing signal m to be inputted. The differentiation pulse signal nb is sent to a falling differentiation circuit 43 to generate a differentiation pulse signal r at a timing of the falling edge of the differentiation pulse signal nb. Also, element 45 is a counter circuit which is a binary up counter of a predetermined number of bits (for example, a 5-bit counter). The counter circuit 45 counts a clock pulse signal cp outputted from a clock pulse generating circuit 44 and is reset by the differentiation pulse signal r. In addition, element 46 is a latch circuit whose set terminal S is connected to an output of the most significant bit of the counter circuit 45 and whose reset terminal R is connected to the differentiation pulse signal r, and element 47 is a D-type flip-flop circuit for taking in an output signal qa of the latch circuit 46 at a timing of the differentiation pulse signal nb so as to thereby output a sustaining signal sa. Also elements 40a and 40b are a first delay circuit and a second delay circuit, respectively. The first delay circuit 40a directly receives the shaping timing signal m and outputs and first delay signal ma having its "H" condition delayed for a predetermined period of time τa from the falling edge of the shaping timing signal m. The second delay circuit 40b receives a signal obtained by inverting the shaping timing signal m through an inverter circuit 41 and outputs a second delay signal mb having its "H" condition delayed for a predetermined period of time τb from the rising edge of the shaping timing signal m. A first slant waveform generating circuit 3a outputs a first slant waveform signal st1. In the first slant waveform generating circuit 3a, elements 50a is a capacitor used charging and discharging so as to generate a triangular waveform signal in response to the first delay signal ma, and a first constant electric current supplying circuit 51a and a second constant electric current supplying circuit 52a each supplies a charging electric current to the capacitor 50a for charging and discharging use the capacitor, whose electric currents to be outputted are respectively expressed as I1 and I2. Of which, the second constant electric current supplying circuit 52a is connected through a switch circuit 56a to the capacitor 50a. The sustaining signal sa operates to open and close the switch circuit 56a through an inverter circuit 55a. That is, when the sustaining signal sa is "H", the switch circuit 56a becomes open, and when being "L", it becomes close. A switch circuit 54a is a circuit for discharging an electric charge being stored in the capacitor 50a. The delay signal ma operates opening and closing the switch circuit 54a through an inverter circuit 53a. That is, when the delay signal ma is "H", the switch circuit 54a is opened, and when the sustaining signal sa is "L", it becomes close. Also, 57a is a buffer circuit whose input is connected to the capacitor 50a and whose output terminal becomes the output terminal of the slant waveform generating circuit 3a to output the first slant waveform signal st1. In addition, element 3b is a second slant waveform generating circuit. In the second slant waveform generating circuit 3b, the members having the same functions as those in the first slant waveform generating circuit 3a and an explanation thereof has been for the sake of preventing duplication excepting that the same reference numerals are used with a suffix b instead of a. The second slant waveform generating circuit 3b receives the second delay signal mb and the sustaining signal sa to generate a second slant waveform signal st2.

The operation of the waveform generating circuit 3 shown in FIG. 7 when the permanent magnet rotor 27 is being normally rotated at a high speed will be explained below using FIG. 8 (a). In FIG. 8 (a), m is a pulse signal outputted from the counter electromotive force detecting circuit 1, nb is a differentiation pulse signal generated through the both edge differentiation circuit 42 at timings of the both edges of the shaping timing signal m, and r is a differentiation pulse signal generated through the falling differentiation circuit 43 at a timing of the falling edge of the differentiation pulse signal nb. The counter circuit 45 counts a clock pulse cp up to the time when the falling differentiation circuit 43 outputs the differentiation pulse signal r. The differentiation pulse signal r has the same period as that of the shaping timing signal m outputted from the counter electromotive force detecting circuit 1, so that the counter circuit 45 means counts the period of the shaping timing signal m. In FIG. 8 (a), the waveform obtained by changing the content of the counter circuit 45 into an analog signal is shown at pp. When the permanent magnet rotor 27 is being rotated at high speed, the count value of the counter circuit 45 is very small, and the most significant bit of the counter circuit 45 to be inputted to the set terminal S of the latch circuit 46 is always at an "L" (low level) condition, so that an output from the output terminal Q of the latch circuit 46 becomes an "L". As a result, the signal of the "L" condition is inputted through the output terminal Q of the latch circuit 46 to the input terminal D of the D-type flip-flop circuit 47, and the pulse signal nb outputted from the both edge differentiation circuit 42 is inputted to the clock terminal CK thereof, so that the sustaining signal sa outputted from the D-type flip-flop circuit 47 is of the "L" condition. Therefore, the switch circuit 56a in the first slant waveform generating circuit 3a is closed, and the charging/discharging capacitor 50a is charged by a combined electric current (I1 and I2) respectively supplied from the constant electric current supplying circuits 51a and 52a. In this case, however, if the delay signal ma becomes an "L", the switch circuit 54a is closed so as to thereby discharge the electric charge stored in the capacitor 50a. The terminal voltage of the capacitor 50a is outputted as the first slant waveform signal st1 through the buffer circuit 57a. As a result, the first slant waveform signal st1 becomes a triangular waveform signal as shown in FIG. 8 (a). The first slant waveform signal st1 is predeterminedly increased in slant so as to be started at the timing point of the rising edge of the shaping timing signal m and when the delay signal ma becomes "L", it becomes a triangular waveform signal of a ground potential. In addition, the time width of the slant portion of the first slant waveform signal st1 is suitably larger than the edge interval (the interval of "H") of the shaping timing signal m.

Similarly, in the second slant waveform generating circuit 3b, since the sustaining signal sa is an "L", the switch circuit 56b is opened. As a result, the charging-/discharging capacitor 50b is charged by a combined electric current (I1+I2) respectively supplied from the constant electric current supplying circuits 51b and 52b. In this case, however, if the delay signal mb becomes an "L", the switch circuit 54b is closed so as to thereby discharge the electric charge stored in the capacitor 50b. The terminal voltage of the capacitor 50b is outputted as the second slant waveform signal st2 through the buffer circuit 57b, so that the second slant waveform signal st2 becomes a triangular waveform signal as shown in FIG. 8 (a). The second slant waveform signal st2 is predeterminedly increased in slant so as to be started at the timing point of the falling edge of the shaping timing signal m and when the delay signal mb becomes an "L", it becomes a triangular waveform signal of an earth potential. In addition, the time width of the slant portion of the second slant waveform signal st2 is suitably larger than the edge interval (the interval of an "L") of the shaping timing signal m.

With the method as shown above, the first slant waveform signal st1 is formed in a triangular waveform signal whose slant is started at the rising edge of the shaping timing signal m, and on the other hand, the second slant waveform signal st2 is formed in a triangular waveform signal whose slant is started at the falling edge thereof, so that the first and second slant waveform signals st1 and st2 are alternately different in timing.

Next, the operation of the slant waveform generating circuit shown in FIG. 7 will be explained below when the permanent magnet rotor 27 is being normally rotated at a low speed using FIG. 8 (b).

When the permanent magnet rotor 27 is being normally rotated at a low speed, the edge interval of the shaping timing signal m outputted from the counter electromotive force detecting circuit 1 becomes larger than that obtained when it is being normally rotated at a high speed, and the count value of the counter circuit 45 becomes larger than the count value (shown at pp in FIG. 8 (a)) obtained when being normally rotated at a high speed. As a result, there is a time at which the most significant bit is changed from an "L" to an "H", so that the latch circuit 46 is reset and its output signal qa is changed to an "H" (FIG. 8 (b); qa). At this time, the edge of the shaping timing signal m arrives and the differentiation pulse signal nb is generated. The output signal qa from the latch circuit 46 is sustained in the D-type flip-flop circuit 47 and the sustaining signal sa outputted from the D-type flip-flop circuit 47 becomes an "H" (FIG. 8 (b); sa).

The first delay signal ma is a pulse signal obtained by extending the "H" interval of the shaping timing signal m by a delay time of τa, and on the other hand, the second delay signal mb is a pulse signal obtained by extending the "H" interval of the inverted signal of the shaping timing signal m by a delay time of τb (FIG. 8 (b); ma, mb).

The sustaining signal sa and the first delay signal ma are inputted to the first slant waveform generating circuit 3b. Since the sustaining signal sa is under the "H" condition, the switch circuit 56a is opened. As a result, a charging current of the capacitor 50a becomes only the electric current I, supplied from the constant electric current supplying current 51a, so that the slant of the first slant waveform signal st1 on a time basis becomes smaller (FIG. 8 (b); st1). In addition, the slant waveform signal shown by the broken lines at st1 in FIG. 8 (b) is the first slant waveform signal obtained when the capacitor 50a is supposed to be charged with the combined electric current (I1+I2).

Similarly, the sustaining signal sa and the second delay signal mb are inputted to the second slant waveform generating circuit 3b. The sustaining signal sa and the second delay signal mb are inputted to the second slant waveform generating circuit 3b. Since the sustaining sign sa is under the "H" condition, the switch circuit 56b is opened. As a result, the charging current of the capacitor 50b becomes only the electric current I1 supplied from the constant electric current supplying circuit 51b, so that the slant of the second slant waveform signal st2 on a time basis becomes smaller (FIG. 8 (b); st2). In addition, the slant waveform signal shown by the broken lines at st2 in FIG. 8 (b) is the second slant waveform signal when the capacitor 50b is supposed to be charged with the combined electric current (I1+I2).

As shown above, when the motor is being normally rotated at a low speed, the slants of the first and second slant waveform signals st1 and st2 on a time basis are made small and the peak value at the edge interval of the shaping timing signal m is made equal to that when it is being normally rotated at high speed.

In addition, the counter circuit 45 has a function to stop counting when overflow is detected, or when it is detected, and a counting operation of the clock pulse signal pp is stopped (not shown).

Next, the operation of the signal forming circuit 4 shown in FIG. 1 will be explained in detail below. The signal forming circuit 4 comprises a first position signal forming circuit 4a and a second position signal forming circuit 4b. The signal forming circuit 4 receives the logical pulse signals of the logical pulse signal generating circuit 2 and the slant waveform signals of the slant waveform generating circuit 3 to form first 3-phase position signals and second 3-phase position signals.

Figure 9:
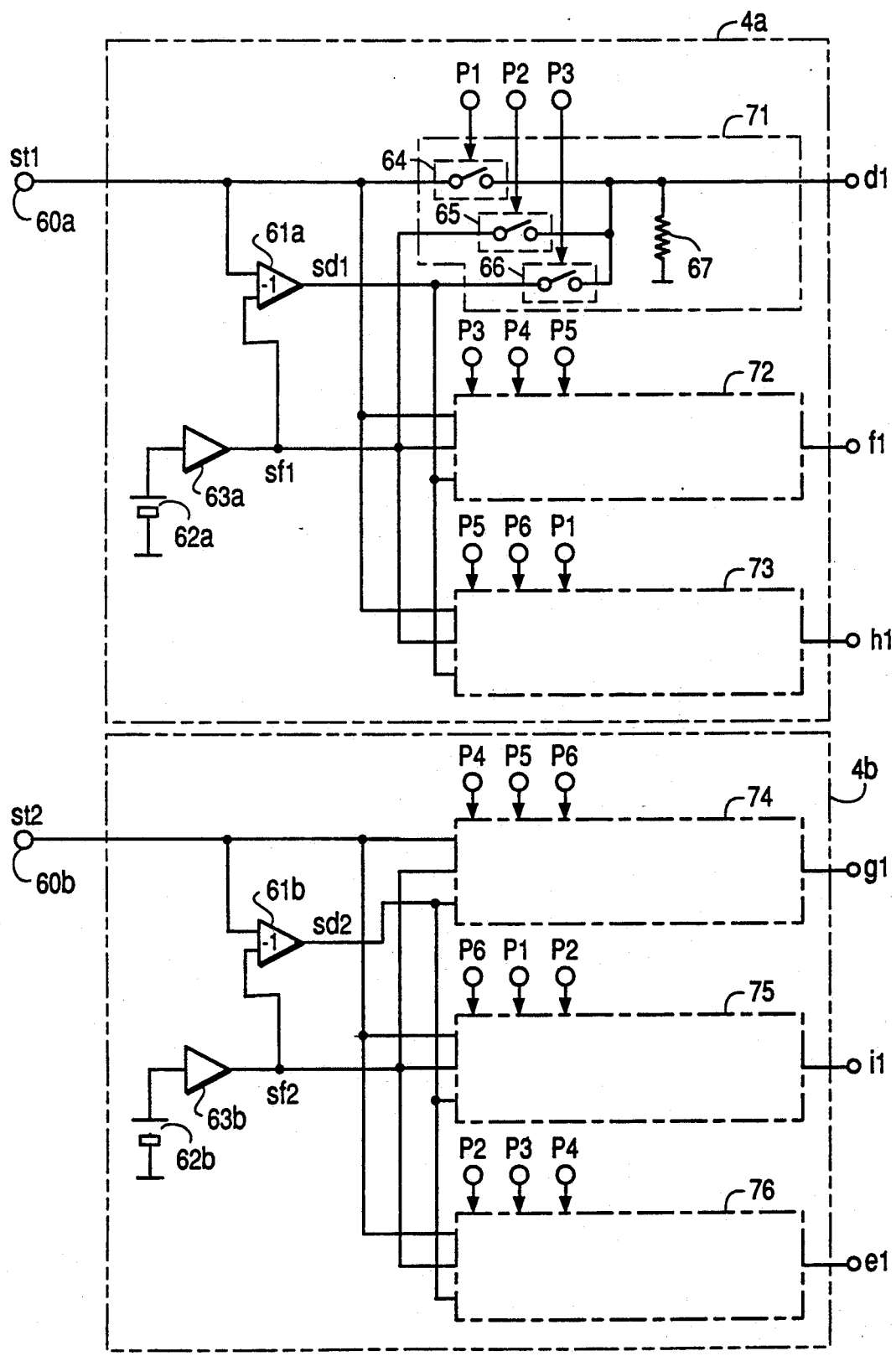
FIG. 9 is a circuit diagram of a signal forming circuit showing an example of that shown in FIG. 1.
Figure 10:
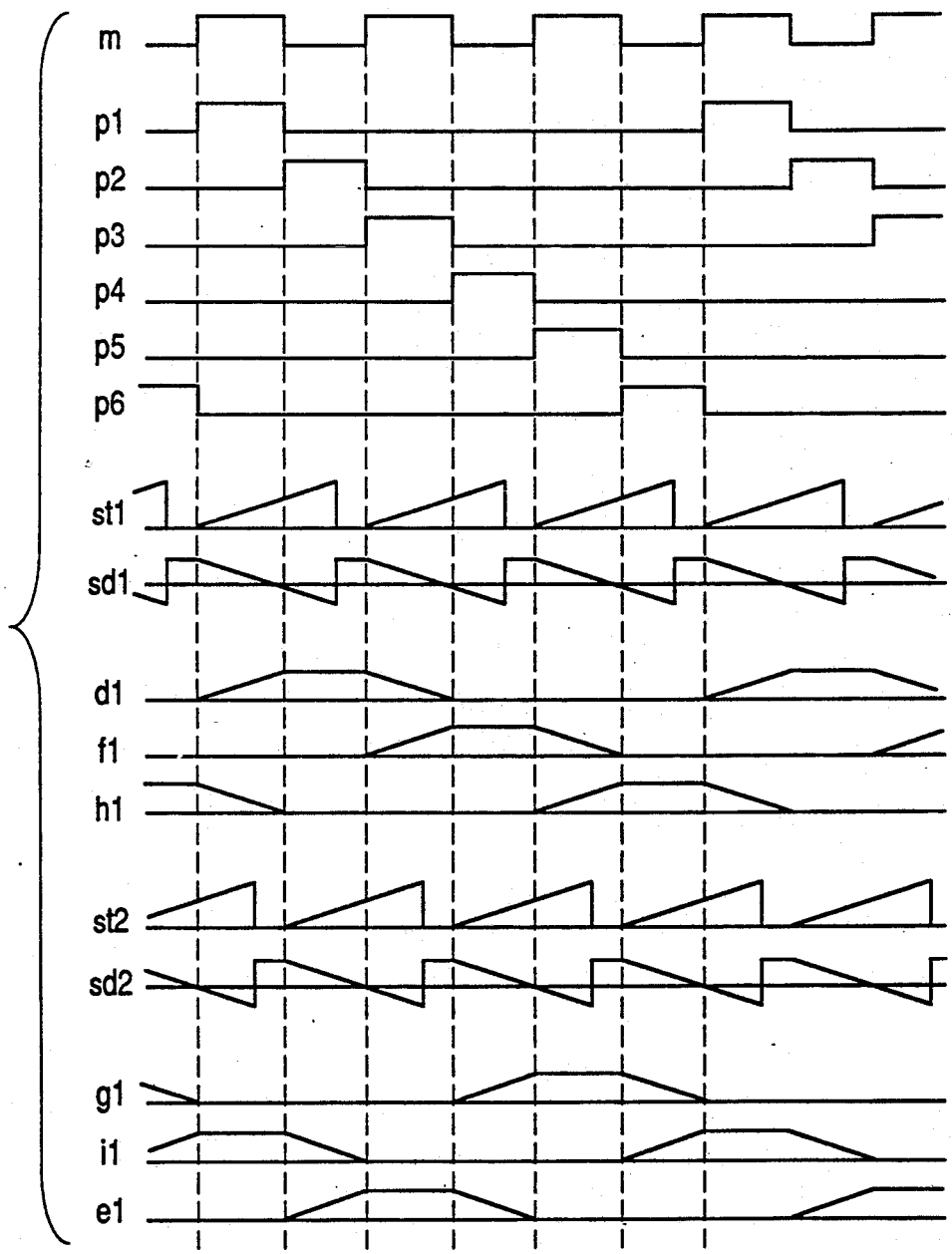
FIG. 10 is a diagram showing a signal waveform outputted from each member of the circuit shown in FIG. 9.

FIG. 9 is a circuit diagram of a signal forming circuit showing an example of the circuit 4 shown in FIG. 1, and FIG. 10 is a waveform diagram outputted from each member of the circuit shown in FIG. 9.

In FIG. 6, element 4a is a first position signal forming circuit and element 60a is an input terminal of the first position signal firming circuit 4a for receiving the first slant waveform signal st1. A buffer circuit 63a is connected to a constant power source 62a to output a first predetermined constant voltage signal sf1 in response to its voltage. An inversion buffer circuit 61a receives the first slant waveform signal st1 and the first constant voltage signal sf1 to obtain a first inverted slant waveform signal sd1 by inverting the first slant waveform signal st1 based on the first constant voltage signal sf1. In addition, the first slant waveform signal st1, the first constant voltage signal sf1 and the first inverted slant waveform signal sd1 are inputted to the signal forming circuits 71, 72 and 73, respectively. The signal forming circuits 71, 72 and 73 have the same structure, and only the structure of the signal forming circuit 71 is typically shown in FIG. 9. In the circuit 71, 64, 65 and 66 are switch circuits whose one terminals are connected to the input terminal 60a, the buffer circuit 63a and the inversion buffer circuit 61a, respectively, and whose other terminals are commonly connected to a resistance 67. A voltage signal obtained across the resistance 67 becomes an output signal of the signal forming circuit 71. In FIG. 9, the switch circuits 64, 65 and 66 are respectively turned ON or OFF in response to the three signals (p1, p2, p3) out of the 6-phase pulse signals p1, p2, p3, p4, p5 and p6 outputted from the logical pulse generating circuit 2. Then, the signal forming circuit 71 outputs a formed signal d1 from its output terminal. Similarly, the signal forming circuits 72 and 73 respectively have three switch circuits (not shown) to be turned ON or OFF in response to the three pulse signals (p3, an explanation p4, p5) and (p5, p6, p1) to output the formed signals f1 and h1 from respective output terminals.

In FIG. 9, 4b is a second position signal forming circuit. For the sake of preventing duplication, an explanation the members having the same functions as those of the first position signal forming circuit 4a has been omitted excepting that the same reference numerals are used with a suffix b instead of a.

In FIG. 9, element 60b is an input terminal of the second position signal forming circuit 4b for receiving the second slant waveform signal st2. The second slant waveform signal st2, the second constant voltage signal sf2 and the second inverted slant waveform signal sd2 are inputted respectively to the signal forming circuits 74, 75 and 76. The signal forming circuits 74, 75 and 76 respectively have three switch circuits (not shown) to be turned ON or OFF in response to the three pulse signals (p4, p5, p6), (p6, p1, p2) and (p2, p3, p4) out of the 6-phase pulse signals p1, p2, p3, p4, p5 and p6 so as to thereby output the formed signals g1, i1, and e1 from respective output terminals.

Next, the operation of the signal forming circuit 4 shown in FIG. 9 will be explained by referring to FIG. 10 showing the signal waveform diagram outputted from each member thereof.

In FIG. 10, m is the output signal of the counter electromotive force detecting circuit 1, p1, p2, p3, p4, p5 and p6 are output signals from the logical pulse generating circuit 2 and st1 and st2 are respectively the first slant waveform signal and the second slant waveform signal outputted from the waveform generating circuit 3. The first slant waveform signal st1 is inputted to the inversion buffer circuit 61a, so that the signal sd1 as shown at sd1 in FIG. 10 is outputted from the inversion buffer circuit 61a, which is obtained by inverting the signal st1 based on the first constant voltage signal sf1 ($sd1 = sf1 - st1$). Similarly, since the second slant waveform signal st2 is inputted to the inversion buffer circuit 61b, the signal sd2 as shown at sd2 in FIG. 10 is outputted from the inversion buffer circuit 61b, which is obtained by inverting the signal st2 based on the second constant voltage signal sf2.

Switch circuits 64, 65 and 66 making the signal forming circuit 71 are closed under the "H" condition in response to the pulse signals p1, p2 and p3 outputted from the logical pulse generating circuit 2 and opened under the "L" condition of the same, so that the outputs of the input terminal 60a, the buffer circuit 63a and the inversion buffer circuit 61a are connected successively to the output terminal of the signal forming circuit 71 so as to thereby obtain a formed signal of trapezoidal waveform as shown at d1 in FIG. 10. In addition, the both signals are equal in potential at the switching point of time, and further when the signals p1, p2 and p3 all are under the "L" condition the switch circuits 64, 65 and 66 are opened and the potential of the resistance 67 becomes equal to a ground potential. As a result, in the resistance 67, the formed signal d1 of trapezoidal waveform is obtained, which has a rising slant portion started at the rising edge of the shaping timing signal m.

In the same manner as shown above, from the output terminals of the signal forming circuits 72, 73, 74, 75 and 76 are respectively outputted the formed signals f1, h1, g1, i1 and e1 of trapezoidal waveform. As a result, the position signal forming circuit 4 generates the 6-phase trapezoidal waveform signals d1, f1, h1, g1, i1 and e1 whose slants are started at the each edge of the shaping timing signal m.

Next, the operation of the signal preparing circuit 6 shown in FIG. 1 will be explained in detail below. The signal preparing circuit 6 includes a first position signal preparing circuit 6a and a second position signla preparing circuit 6b thereby preparing 6-phase position signals of trapezoidal waveform (first position signals and second position signals) from the 6-phase formed signals d1, f1, h1, g1, i1, and e1 of the signal forming circuit 4.

Figure 11:
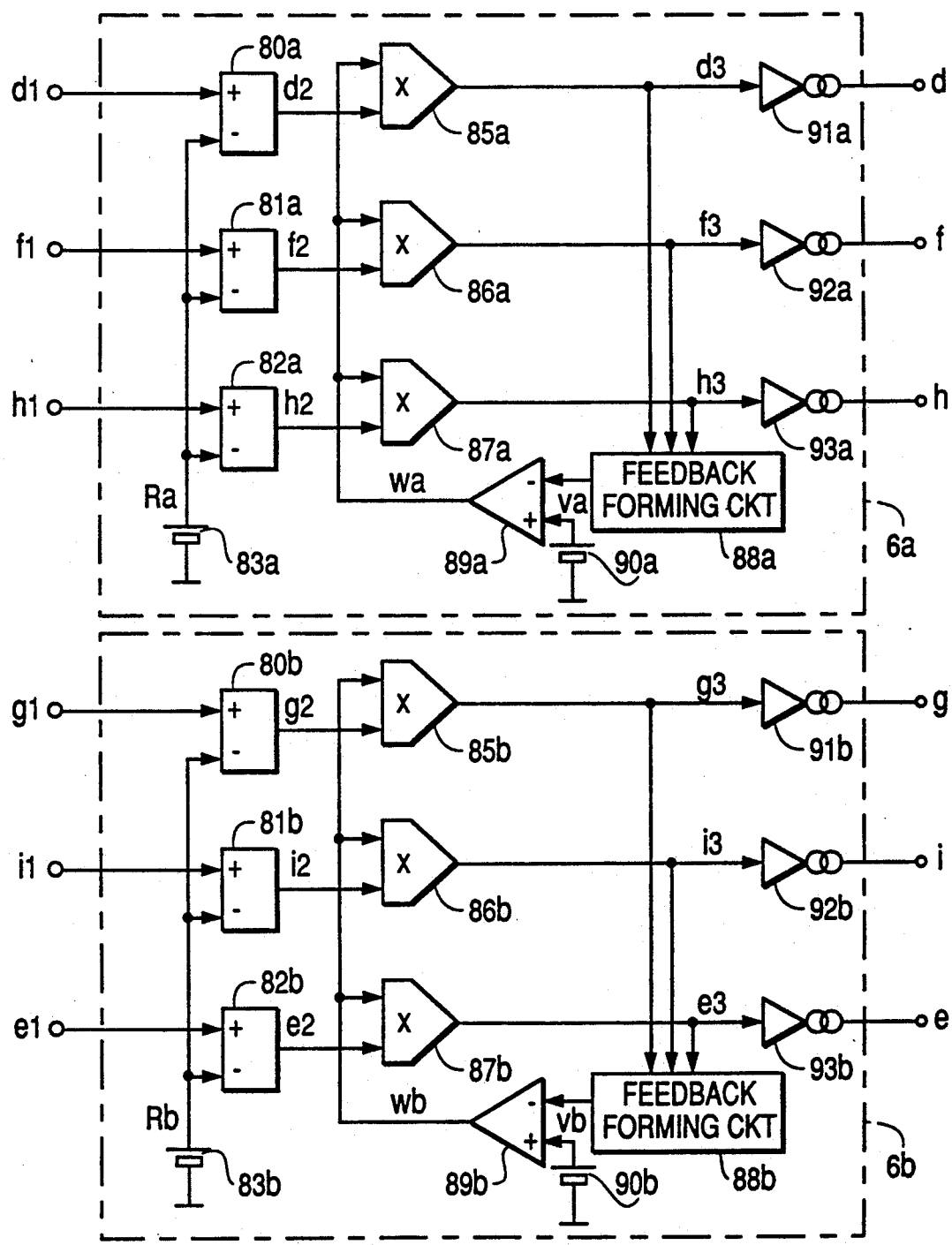
FIG. 11 is a circuit diagram of a signal preparing circuit showing an example of that shown in FIG. 1.
Figure 12:
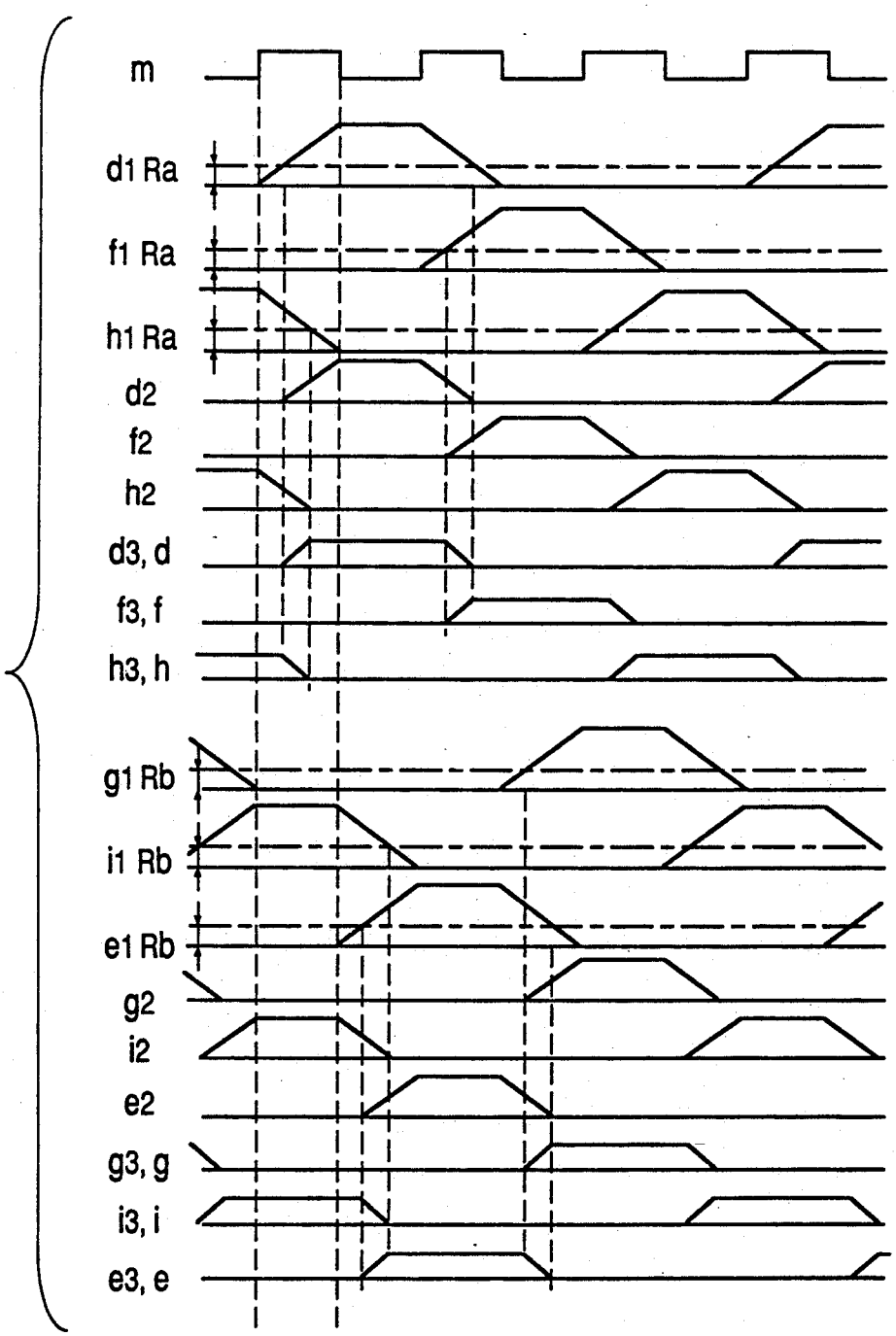
FIG. 12 is a diagram showing a signal waveform outputted from each member of the circuit shown in FIG. 11.

FIG. 11 is a circuit diagram of a signal preparing circuit showing an example of the circuit 6 shown in FIG. 1 and FIG. 12 is a diagram showing a signal waveform outputted from each member of the circuit shown in FIG. 11.

In FIG. 11, element 6a is a first position signal preparing circuit and element 6b a second position signal preparing circuit. In the first position signal preparing circuit 6a, element 83a is a constant power source; elements 80a, 81a, and 82a are subtraction limit circuits respectively receiving the formed signals d1, f1 and h1 formed by the signal forming circuit 4 and a predetermined voltage Ra of the constant voltage source 83a. In addition, elements 85a, 86a and 87a are multiplier circuits respectively receiving the outputs of the subtraction limit circuits 80a, 81a and 82a. Output signals of the multipliers 85a, 86a and 87a are added by a feedback forming circuit 88a. The resultant signal obtained by the feedback forming circuit 88a is inputted to one input terminal (−) of an operational amplifier circuit 89a, and to the other input terminal (+) thereof is inputted a direct-current value of a constant voltage source 90a. An output signal of the operational amplifier 89a is sent to the gain control input terminals of the multipliers 85a, 86a and 87a to control the gains of the multipliers 85a, 86a and 87a. Thus, the multipliers 85a, 86a and 87a output the voltage signals d3, f3 and h3, respectively. The voltage signals d3, f3 and h3 thus outputted respectively from the multipliers 85a, 86a and 87a are converted into the electrical current signals d, f and h by the current converting circuits 91a, 92a and 93a, respectively.

In addition, in the second position signal preparing circuit 6b, for the sake of preventing duplication, an explanation of the members having the same functions as those of the first position signal preparing circuit 6a has been omitted except the same reference numerals are used with a suffix b instead of a. In the second position signal preparing circuit 6b, the signals g1, i1 and e1 formed by the signal forming circuit 4 are converted into the voltage signals g3, i3 and e3, and then into the electrical current signals g, i and e, respectively.

The operation of the signal preparing circuit 6 shown in FIG. 11 will be explained below by referring to FIG. 12 showing a signal waveform outputted from each member thereof.

In FIG. 12, m is the output pulse of the counter electromotive force detecting circuit 1 and d1, f1, h1, g1, i1 and e1 are 6-phase signals formed by the signal forming circuit 4. In addition, values shown by the alternate long and short dash lines are the direct-current values Ra and Rb of the constant voltage sources 83a and 83b, respectively. The first formed signals d1, f1 and h1 are inputted respectively to one input terminal (+) of each of the subtraction limit circuits 80a, 81a and 82a, and to the other input terminal (−) is inputted the predetermined voltage Ra of the constant voltage source 83a. The subtraction limit circuits 80a, 81a and 82a respectively subtract the predetermined voltage Ra from the formed signals d1, f1 and h1, and output the limit signals d2, f2 and h2 in which the negative voltage portion is limited to the ground potential (FIG. 12; d2, f2 and h2).

The multipliers 85a, 86a and 87a multiply an output signal wa of the operational amplifier circuit 89a respectively by the limit signals d2, f2 and h2 to thereby output the multiplied signals d3, f3 and h3. That is;

$$d3 = d2 \times wa \quad (1)$$

$$f3 = f2 \times wa \quad (2)$$

$$h3 = h2 \times wa \quad (3)$$

are outputted, respectively.

The feedback forming circuit 88a executes the addition of the multiplied signals d3, f3 and h3 to output a feedback formed signal (d3+f3+h3). The operational amplifier 89a compares a first command voltage signal Va of a first command voltage source 90a inputted to its one input terminal (+) and the feedback formed signal inputted to its other input terminal (−) to output the signal wa having its difference voltage amplified to the multiplier circuits 85a, 86a and 87a. The multipliers 85a, 86a and 87a, the feedback forming circuit 88a and the operational amplifier 89a make a first negative-feedback loop in which the 3-phase signals d3, f3 and h3 are formed respectively in response to the first 3-phase firmed signals d1, f1 and h1. The first negative-feedback loop operates so that the feedback formed signal (d3+f3+h3) of the feedback forming circuit 88a can be made equal to the first command voltage signal Va of the first command voltage source 90a. That is, it operates as:

$$d3 + f3 + h3 = Va \quad (4)$$

From the above-mentioned equations (1) to (4) and the waveforms of the limit signals d2, f2 and h2, the multiplied signals d3, f3 and h3 become respectively as shown in FIG. 12. For example, if d2≠0, f2=0 and h2=0, d3=Va. Or, if d2≠0, f2≠0 and h2=0, d3:f3=d2:f2 (provided that d3+f3=Va). This means that the signal values of d3 and f3 are those obtained by distributing the value of Va at a ratio of the signal value of d2 and signal value of f2. As a result, the multiplied signals d3, f3 and h3 become trapezoidal in signal waveform and the added value thereof becomes equal to the first command voltage value Va.

Electrical current converting circuits 91a, 92a and 93a respectively convert the multiplied signals d3, f3 and h3 of trapezoidal waveform into 3-phase position signals d, f and h of trapezoidal waveform to thereby output them as the first position signals (taking in of electrical current). Namely, the position signals d, f and h are equal in waveform to the multiplied signals d3, f3 and h3, respectively. As shown above, the first position signals d, f and h are trapezoidal in waveform and their rising and falling slants can be timely and easily set or changed by setting the voltage value Ra of the constant voltage source 83a. In addition, the central phase of each of the first position signals d, f and h coincides with that of each of the first formed signals d1, f1 and h1.

Similarly, the second 3-phase formed signals g1, i1 and e1 are inputted to the second position signal preparing circuit 6b. The subtraction limit circuits 80b, 81b and 82b subtract the predetermined voltage Rb respectively from the formed signals g1, i1 and e1 to obtain limit signals g2, i2 and e2. Also, the multiplied signals g3, i3 and e3 are outputted from the multipliers 85b, 86b and 87b, respectively.

In addition, in the second position signal preparing circuit 6b, for the sake of preventing duplication, an explanation of the members having the same functions as those of the first position signal preparing circuit 6a has been omitted except the same reference numerals are used with a suffix b instead of a.

The multipliers 85a, 86a and 87a, the feedback forming circuit 88a and the operational amplifier 89a makes a second negative-feedback loop for forming the 3-phase signals g3, i3 and e3 respectively in response to the second 3-phase formed signals g1, i1, and e1. By the second negative-feedback loop, the following is obtained as:

$$g3 + i3 + i3 = Vb \quad (5)$$

Thus, the multiplied signals g3, i3 and e3 as shown in FIG. 12 are obtained respectively in response to the waveforms of the limit signals g2, i2 and e2. As a result, the multiplied signals g3, i3 and e3 become trapezoidal in waveform and their added value (g3+i3+e3) becomes equal to the second command voltage value Vb.

Electrical current converting circuits 91a, 92a and 93a respectively convert the multiplied signals g3, i3 and e3 of trapezoidal waveform into 3-phase position signals g, i and e of trapezoidal waveform to thereby output them as the second position signals (taking out of electrical current). Namely, the position signals g, i and e are equal in waveform to the multiplied signals g3, i3 and e3 as shown in FIG. 12. As shown above, the second position signals g, i and e are trapezoidal in waveform and their rising and falling slants can be timely and easily set or changed by setting the voltage value Rb of the constant voltage source 83b. In addition, the central phase of each of the second position signals g, i and e coincides with that of each of the second formed signals g1, i1, and e1.

Next, detailed explanations follow on the operation of the power supplying circuit 5 shown in FIG. 1. The signal waveform outputted from each member of the power supplying circuit 5 in FIG. 2 which has already been explained is shown in FIG. 13.

Figure 13:
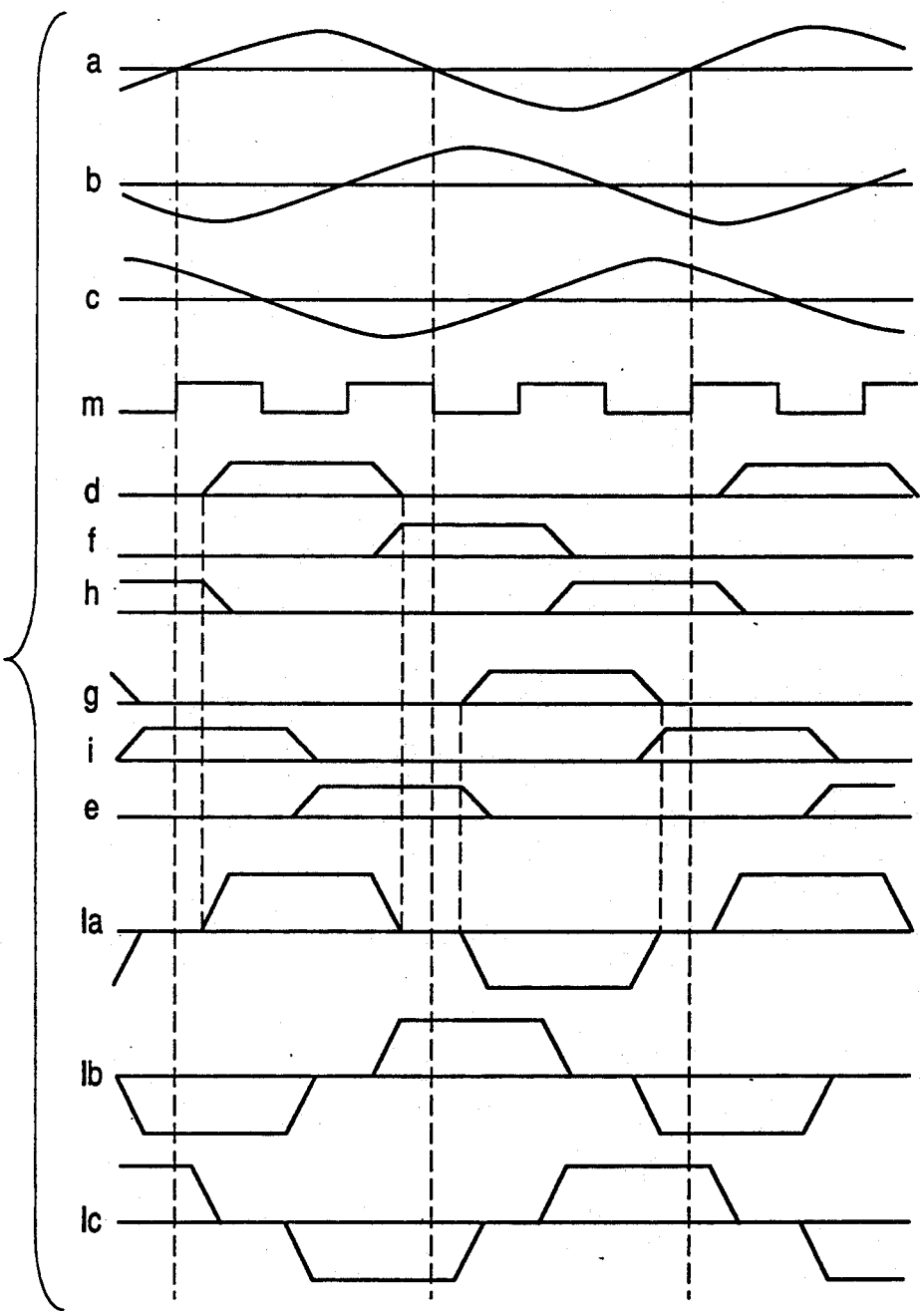
FIGS. 13 and 14 each is a diagram showing a signal waveform outputted from each member of the circuit shown in FIG. 2.

Thereinafter, the operation of the power supplying circuit 5 shown in FIG. 2 will be explained below by referring to FIG. 13 showing a signal waveform outputted from each member thereof.

As shown in FIG. 2, the first 3-phase position signals d, f and h (electrical current signal) of a trapezoidal waveform prepared by the first position signal preparing circuit 6a of the signal preparing circuit 6 are supplied respectively to the bases of the first driving transistors 21, 22 and 23 to control the conduction of electrical currents to the first driving transistors. Similarly, the second 3-phase position signals g, i and e (electrical current signal) of a trapezoidal waveform prepared by the second position signal preparing circuit 6b are supplied respectively to the bases of the second driving transistors 24, 25 and 26 to control the conduction of electrical currents to the second driving transistors. Accompanied with the rotation of the permanent magnet rotor 27, the 6-phase position signals d, f, h, g, i and e are changed as shown in FIG. 13, and 3-phase trapezoidal waveform electrical currents Ia, Ib and Ic as shown in FIG. 13 are supplied bidirectionally respectively to the stator windings a, b and c of the rotor 27.

As a result, the permanent magnet rotor 27 is driven to be rotated to thereby continue the rotation at a predetermined speed. In FIG. 13, the counter electromotive forces a, b and c respectively induced in the stator windings 11, 12 and 13 are shown. When the motor is being normally rotated, the counter electromotive forces a, b and c become equal in phase to the electrical currents Ia, Ib and Ic. In addition, the conduction of electrical currents to the driving transistors is controlled so that the electrical currents Ia, Ib and Ic respectively become trapezoidal in waveform. As a result, electrical currents Ia, Ib and Ic to be supplied to the stator windings at the zero-crossing points of the counter electromotive forces a, b and c of the stator windings 11, 12 and 13 become zero, respectively. Accordingly, the counter electromotive force detecting circuit 1 can detect precisely the zero-crossing point of each of the counter electromotive forces a, b and c respectively induced in the stator windings 11, 12 and 13.

Next, the operation of the embodiment of this invention shown in FIGS. 1 to 13 will be explained below.

The counter electromotive force detecting circuit 1 shapes the double end voltages of the stator windings 11, 12 and 13 and generates 3-phase shaping signals u, v and w in response to the counter electromotive forces a, b and c induced in the stator windings 11, 12 and 13, respectively, thus preparing the shaping timing signal m to be changed in response to each edge of the shaping signals u, v and w. The logical pulse generating circuit 2 generates 6-phase logical pulses p1, p2, p3, p4, p5 and p6 to be shifted at each edge of the shaping timing signal m. The waveform generating circuit 3 generates the first slant waveform signal st1 whose slant is started from the rising edge of the shaping timing signal m and the second slant waveform signal st2 whose slant is started from the falling edge thereof. The signal forming circuit 4 forms the first 3-phase formed signals d1, f1 and h1 of trapezoidal waveform from the logical pulses p1, p2, p3, p4, p5 and p6 and the first slant waveform signal st1, each of which has the rising slant portion and falling slant portion started from the rising edge of the shaping timing signal m, and the second 3-phase formed signals g1, i1 and e1 of trapezoidal waveform from the logical pulses p1, p2, p3, p4, p5 and p6 and the second slant waveform signal st2, each of which has the rising slant portion and falling slant portion started from the falling edge thereof. The signal preparing circuit 6 prepares the first 3-phase position signals d, f and h of a trapezoidal waveform respectively from the first 3-phase formed signals d1, f1 and h1, and the second 3-phase position signals g, i and e of a trapezoidal waveform respectively from the second 3-phase formed signals g1, i1 and e1. The first position signals d, h and f and the second position signals g, i and e are different in phase from each other. As a result, the signal forming circuit 4 and the signal preparing circuit 6 generate 6-phase position signals in total. The conduction of electrical currents to the first driving transistors group 5a of the power supplying circuit 5 is controlled by the first position signals and the conduction of electrical currents to the second driving transistors group 5b thereof is controlled by the second position signals. As a result, the stator windings 11, 12 and 13 are supplied bidirectionally with the 3-phase electrical currents Ia, Ib and Ic of trapezoidal waveform, respectively, by the first driving transistors group 5a and second driving transistors group 5b. When rotated normally, the counter electromotive forces a, b, c induced in the stator windings 11, 12 and 13 and the electrical currents Ia, Ib and Ic are equal in phase, respectively (refer to FIG. 14). As explained above, according to this embodiment, a brushless DC motor which does not have a position sensor can be practically realized.

In addition, in this embodiment, the position signals each has a trapezoidal waveform whose rising and falling slant portions are smoothly formed. Accordingly, the electrical current signals each becomes of trapezoidal waveform, so that switching operation of the electrical current of the stator windings can be made smoothly, thus making it possible to realize a motor extremely small in vibration and/or noise occurrence.

The slant of the position signals can be easily set and changed in accordance with the set voltages Ra and Rb of respective constant voltage sources 83a and 83b of the signal preparing circuit 6. Namely, by setting the values of Ra and Rb suitably, electrical currents of trapezoidal waveform having the desired slant can be supplied bidirectionally to the stator windings, and by changing the values of Ra and Rb, the slant thereof can be timely changed. For example, if Ra and Rb each is set at a predetermined value when starting and accelerating and changed it to zero when rotating normally, stable starting and acceleration can be provided and vibration and/or noise occurrence can be outstandingly reduced when rotating normally. Detailed explanations will be made on this below.

First, if the values of Ra and Rb are made large when starting or accelerating, the slant of the trapezoidal waveform position signals can be made steep, so that the interval where an electrical current to be supplied to each of the stator windings can be made wider. As a result, in event that the edge interval of the shaping timing signal m is gradually reduced accompanying with acceleration, the zero-crossing points of the counter electromotive forces can be stably detected, resulting in stable switching operation of the electrical current lines. Namely, stable operation can be provided in acceleration.

Next, if the values of Ra and Rb are made zero when rotating normally, the first position signals d, f and h and the second position signals g, i and e, which are trapezoidal in waveform whose slants are made outstandingly smooth, are prepared respectively in response to the first formed signals d1, f1 and h1 and the second formed signals g1, i1 and e1. The first position signals d, f and h and the second position signals g, i and e each has a rising slant portion of 60° in terms of electrical angle (edge interval of the shaping timing signal m), a flat portion of 60° in terms of electrical angle and a falling slant portion of 60° in terms of electrical angle, which means that it can be changed to an extremely smooth trapezoidal waveform (one period of a counter electromotive force is 360° in terms of electrical angle). As a result, as shown at Ia, Ib and Ic in FIG. 14, the electrical currents to be supplied to the stator windings are of an extremely smooth trapezoidal waveform, so that vibration and noise occurrence can be outstandingly reduced when the motor is being rotated normally.

In addition, as shown in this embodiment, by providing such a first negative-feedback loop as shown already in the first position signal preparing circuit 6a of the signal preparing circuit 6, the added value of the first 3-phase position signals (multiplied signals) can be made constant, and the formed electrical currents that the first driving transistors group supplies to the stator windings can be made constant, so that pulsation of electrical currents to be supplied to the stator windings can be made zero or substantially zero. Also, by providing such a second negative-feedback loop as already shown in the second position signal preparing circuit 6b of the signal preparing circuit 6, the added value of the second 3-phase position signals (multiplied signals) can be made constant, and the formed electric currents that the second driving transistors group supplies to the stator windings can be made constant, so that the pulsation of electrical currents to be supplied to the stator windings can be made zero, resulting in obtaining development of uniform torques. In addition, there is a predetermined relationship between the first command voltage signal Va of the first command voltage source 90a of the signal preparing circuit 6 and the second command voltage signal Vb of the second command voltage source 90b thereof, and the formed electrical current supplied from the first driving transistors group and the formed electrical current supplied from the second driving transistors group are made equal to each other.

Also, as shown in this embodiment, by changing the slants of the slant waveform signals (the first and second slant waveform signals) generated by the waveform generating circuit in response to the period of the shaping signal (half-period of the shaping timing signal m), even when the rotation of the motor is changed, such smooth trapezoidal waveform position signals as described above can be easily obtained.

Figure 15:
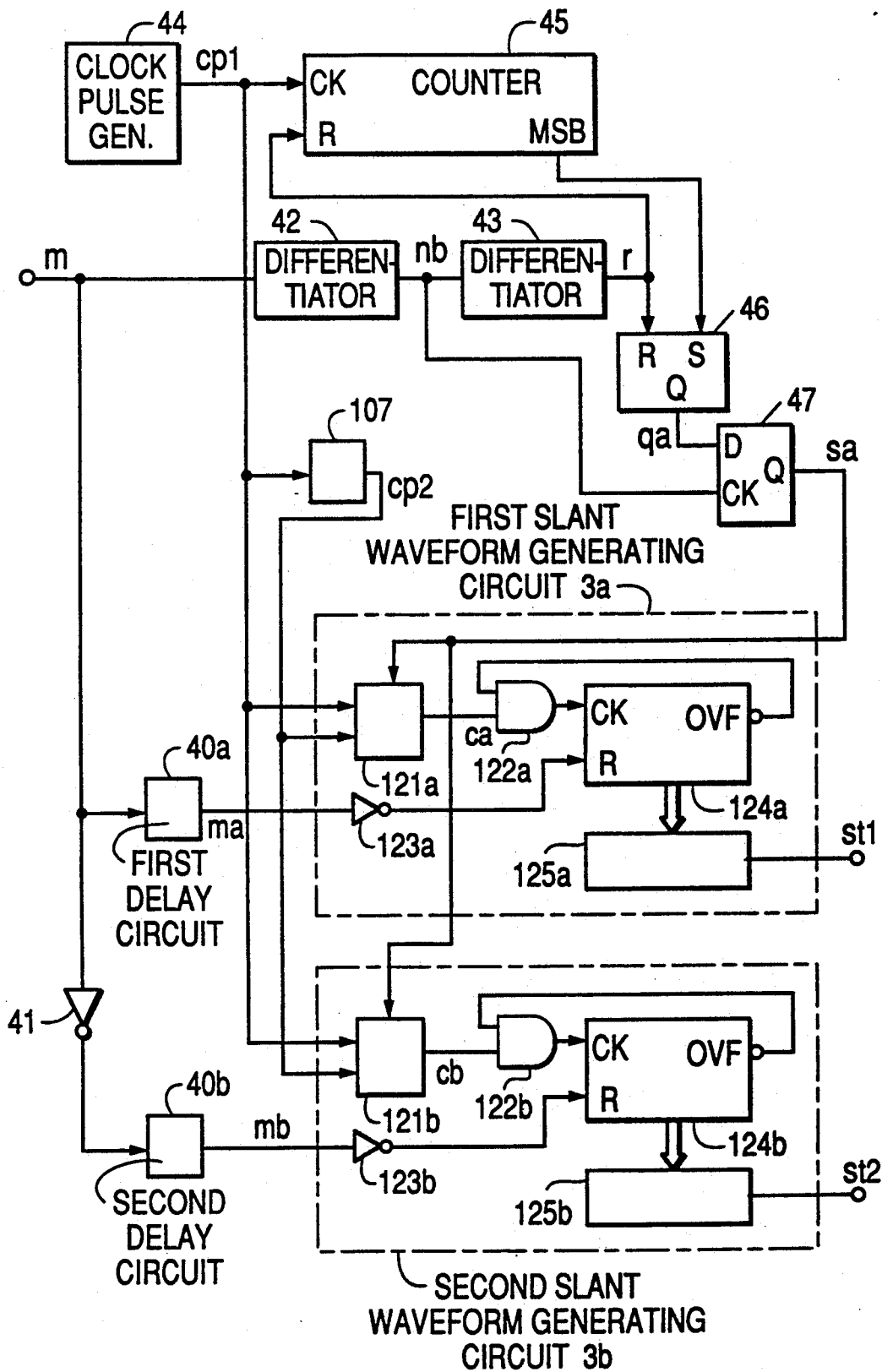
FIG. 15 is a circuit diagram of a waveform generating circuit showing another example of that shown in FIG. 1.

FIG. 15 is a circuit diagram of a waveform generating circuit showing another example of the waveform generating circuit 3 shown in FIG. 1. The operation thereof will be explained below. In this case, however, the circuit diagram of FIG. 15 is arranged in such a manner that the first slant waveform generating circuit 3a and second slant waveform generating circuit 3b of FIG. 7 are replaced with digital circuits. In FIG. 15, an explanation of the members having the same functions as those shown in FIG. 7 have the same reference numerals have been omitted for the sake of preventing duplication. FIGS. 8 (a) and 8 (b) are diagrams showing signal waveforms outputted from each member thereof, in which the signals having the same functions are expressed by the same names.

In FIG. 15, 107 is a frequency dividing circuit which receives a clock pulse signal cp1 to perform it to divide predeterminedly and outputs a divided clock pulse signal cp2. The clock pulse signal cp1 and the divided clock pulse signal cp2 are inputted to a first slant waveform generating circuit 3a and a second slant waveform generating circuit 3b. In the first slant waveform generating circuit 3a, 121a is a selecting circuit which selects the clock pulse signal cp1 and the divided clock pulse signal cp2 in response to the condition of the sustaining signal sa thereby to output a first clock signal ca. That is, when the sustaining signal sa is under the "L" condition, it selects the clock pulse signal cp1 and when it is under the "H" condition, it selects the divided clock pulse signal cp2. In addition, 124a is an up-type counter circuit which receives the clock signal ca of the selecting signal 121a from its clock terminal CK via an AND circuit 122a. Also, the up-type counter 124a outputs the inverted signal of the most significant bit to the AND circuit 122a as an overflow (OVF) signal, and when being overflowed, it stops to receive the clock signal ca thereby to limit the content of the up-type counter circuit 124a to a predetermined value to sustain. Also, the up-type counter 124a receives from its reset terminal R a first delay signals ma outputted from a first delay circuit 40a via an inverter circuit 123a. A digital-analog (D/A) converter 125a converts the content of the counter 124a into an analog voltage to output the first slant waveform signal st1.

Similarly, the second slant waveform generating circuit 3b outputs the second slant waveform signal st2. In addition, in the second slant waveform generating circuit 3b, the members having the same functions as those in the first slant waveform generating circuit 3a are omitted to be explained excepting that the same reference numerals are used with a suffix b instead of a for the sake of preventing duplication.

The operation of the waveform generating circuit shown in FIG. 15 will be explained when the permanent magnet rotor 27 is being normally rotated at high and low speeds similar to the case shown in FIG. 7.

The up-type counter circuit 124a receives the first clock signal ca and its count value is increased monotonously with a time, so that the output of the D/A converter 125a for converting the content of the counter 124a into an analog value is increased at a constant slant similar to the circuit shown in FIG. 7. In this case, however, when the first delay signal ma that the counter 124a receives becomes "L", the content of the counter 124a is simultaneously reset, so that from the D/A converter 125a is outputted the first slant waveform signal st1 (FIG. 8 (a):st1). However, when rotated at high speed, similar to that case shown in FIG. 7, the sustaining signal sa of the D-type flip-flop circuit 47 is under the "L" condition, and the selecting circuit 121a selects the clock pulse signal cp1 as the clock signal ca. On the other hand, when rotated at low speed, the sustaining signal sa of the D-type flip-flop circuit 47 is under the "H" condition, and the selecting circuit 121a selects the divided clock pulse signal cp2 as the clock signal ca. Namely, the frequency of the clock signal ca (=cp2) when rotated at low speed becomes smaller than that of the clock signal ca (=cp1) when rotated at high speed on a rotational speed ratio basis (1: predetermined dividing value corresponding to the rotational speed ratio). As a result, the counter 124a up-counts gently on a time basis, so that the slant of the first slant waveform signal st1 having the content of the counter 124a converted into an analog value by the D-type flip-flop circuit 125a becomes gentle on a time basis (FIG. 8 (b):st1). In addition, the waveform shown by the broken lines shown at st1 in FIG. 8 (b) indicates the first slant waveform signal obtained when the counting is supposed to be made by the clock pulse signal cp1.

Even when the rotational speed of the motor is changed from high to low level, the frequency of the clock signal ca inputted to the counter 124a becomes small from cp1 to cp2, so that even if the period of the shaping pulse signal m becomes long due to reduction in rotational speed, the count values of the counter 124b are substantially equalized independent of the rotational speed. As a result, the peak value of the output signal st1 obtained by converting the content of the counter 124a into an analog value by the D/A converter 125a can be made substantially equal to that of the embodiment shown in FIG. 7, so that the first slant waveform generating circuit 3a outputs the slant waveform signal st1 whose rising slant is started from the rising edge of the shaping pulse signal m and whose peak values are substantially equalized independent of its rotational speed. Similarly, the second slant waveform generating circuit 3b outputs the slant waveform signal st2 whose rising slant is started from the falling edge of the shaping pulse signal m and whose peak values are substantially equalized independent of the rotational speed (FIG. 8 (b):st2). In addition, the waveform shown by the broken lines shown at st2 in FIG. 8 (b) indicates the second slant waveform signal obtained when the counting is supposed to be made by the clock pulse signal cp1.

As explained above, when the motor is being rotated at low speed, the first slant waveform signal st1 and second waveform signal st2 are made gentle in slant on a time basis, and their peak values at the edge interval of the shaping timing signal m are made equal to those obtained when it is being rotated at high speed. Therefore, similar to the case of rotating the motor at high speed, when rotated at low speed, trapezoidal waveform position signals having smooth rising and falling slants can be formed, and the electrical current signals to be supplied to the stator windings can be made of smooth trapezoidal waveform.

As described in the embodiment, by digitally arranging the first slant waveform generating circuit 3a and the second slant waveform generating circuit 3b using a counter circuit or a D/A converter circuit, a highly accurate slant waveform signal st1 or st2 can be obtained with a simple arrangement or circuit. That is, a highly accurate clock signal can be generated by using qualtz-crystal oscillator or the like, and it can be converted into an analog signal highly accurately by using a D/A converter circuit of the R-2R RADA resistance type or the like, so that a slant waveform signal highly accurate on a time basis can be prepared. Accordingly, the accuracies of the rising and falling slant portions of trapezoidal waveform position signals can be made extremely high, and the electric current signals Ia, Ib and Ic having the desired trapezoidal waveform as shown in FIG. 3 or FIG. 14 can be easily supplied bidirectionally to the stator windings. Particularly, dispersion in mass-production and deteriorating change with time can be extremely reduced.

In addition, when it is to be switched to high or low speed, by changing the frequency of the clock signal ca sent to the counter circuit of the first slant waveform generating circuit 3a and the frequency of the clock signal cb sent to the counter of the second slant waveform generating circuit 3b, the slant of the first slant waveform signal st1 and that of the second slant waveform signal st2 on a time basis can be easily changed. Namely, the motor of this embodiment can be easily accommodated to the application where the rotational speed is to be changed. Also, the selecting circuits 121a and 121 may be made of one unit to thereby make the clock signals ca and cb equal to each other.

Figure 16:
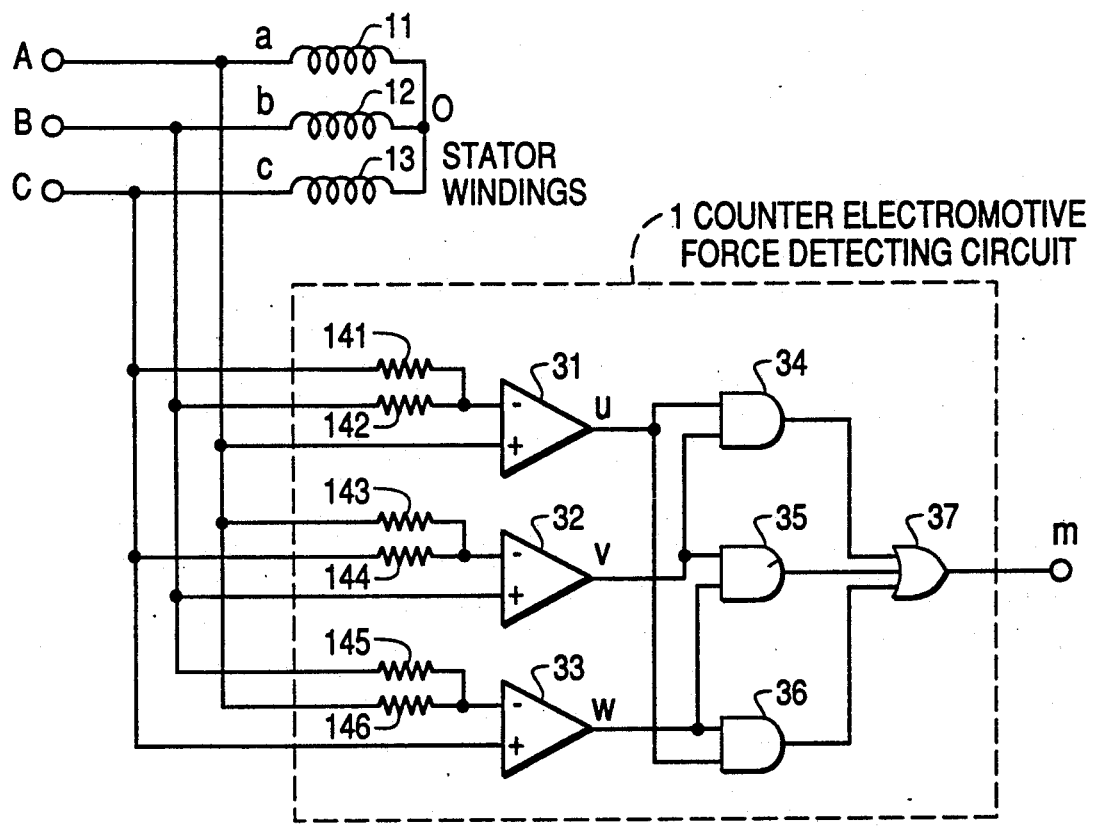
FIG. 16 is a circuit diagram of a counter electromotive force detecting circuit showing another example of that shown in FIG. 1.

FIG. 16 is a circuit diagram of a counter electromotive force detecting circuit showing another example of the circuit 1 shown in FIG. 1. The operation thereof will be explained below. In FIG. 16, for the sake of preventing duplication, an explanation of the members, having the same functions as those in FIG. 3 have been omitted except that the same reference numerals are used with a suffix b instead of a. Signal waveforms outputted from the members thereof are expressed by the same names as those in FIG. 4.

In the embodiment shown in FIG. 16, by connecting to the electrical current supplying terminals A, B and C only without connecting to the neutral point 0, the 3-phase shaping signals u, v and w can be obtained. In FIG. 16, a comparator circuit 31 has one input terminal (+) connected to the current supplying terminal A and the other input terminal (−) connected via respective resistances 141 and 142 to the current supplying terminals B and C. If the resistances 141 and 142 are equal in resistance value to each other, the combined voltage of the resistances 141 and 142 becomes equal to the inverted voltage of the double end voltage of the stator winding 11 when looked from the neutral point 0. As a result, the shaping signal u of the comparator 31 becomes a signal to be changed at the zero-crossing points of the counter electromotive force a of the stator winding 11 as shown in FIG. 4. Similarly, a comparator circuit 32 has one input terminal (+) connected to the current supplying terminal B and the other input terminal (−) connected via respective resistances 143 and 144 to the current supplying terminals C and A. If the resistances 143 and 144 are equal in resistance value to each other, the combined voltage of the resistances 143 and 144 becomes equal to the inverted voltage of the double end voltage of the stator winding 12 when looked from the neutral point 0. As a result, the shaping signal v of the comparator 32 becomes a signal to be changed at the zero-crossing points of the counter electromotive force b of the stator winding 12 as shown in FIG. 4. Similarly, a comparator circuit 33 has one input terminal (+) connected to the current supplying terminal C and the other input terminal (−) connected via respective resistances 145 and 146 to the current supplying terminals A and B. If the resistance values of the resistances 145 and 146 are equal to each other, the combined voltage of the resistances 145 and 146 becomes equal to the inverted voltage of the double end voltage of the stator winding 13 when looked from the neutral point 0. As a result, the shaping signal w of the comparator 33 becomes a signal to be changed at the zero-crossing points of the counter electromotive force C of the stator winding 13 as shown in FIG. 4. The 3-phase shaping signals u, v and w are logically combined by the AND circuits 34, 35 and 36 and the OR circuit 37 to obtain the shaping timing signal m which is changed at each edge of the shaping signal u, v and w. The rising edges of the shaping timing signal m are corresponded to the zero-crossing points of the rising side of each counter electromotive force, and the falling edges of the shaping timing signal m are corresponded to the zero-crossing points of the falling side of each counter electromotive force.

In this embodiment, despite of being connected only to the current supplying terminals, the zero-crossing points of each counter electromotive force can be detected accurately. In addition, by setting the resistance values of the resistances 141 to 146 suitably, the detection phase can be slightly shifted.

Particularly, in case that the counter electromotive forces are detected to control the timing of conducting electric current to the stator windings and trapezoidal waveform electrical current signals are supplied bidirectionally to the stator windings in response to the detected signals as described in this embodiment, it is preferable to make the resistance values of the resistances 141, 143 and 145 respectively slightly larger (about 10%) than those of the resistances 142, 144 and 146 in that the detection phase (timing that the shaping signal is changed) can be set slightly earlier than the exact zero-crossing point of each counter electromotive force, leading to obtaining good results.

As clear from the above descriptions, the brushless DC motor of this invention provides us with a full wave driving motor which does not have a rotor position sensor such as the Hall sensor and supplies an electrical current bidirectionally to the stator windings of the rotor.

In the embodiments of this invention, a motor to be used is limited to a 3-phase stator windings of Y (star) connection, but it is not limited thereto, it can be applied to a motor whose stator winding are of the Δ connection.

Also, the waveform generating circuit in the embodiments of this invention is arranged such that the slant waveform signal can be switched its slant on a time basis at two steps in response to the period of the shaping timing signal m, but it is not limited to the two steps, it can be increased to three steps or more, and also, it is needless to say that the slant on a time basis of the slant waveform signal may be continuously changed in response to the period of the shaping timing signal m.

In addition, the logical pulse generating circuit of this invention prepares 6-phase logical pulse signals using the shaping timing signal m, but it is not limited thereto, for example, the logical pulse signals can be prepared by directly using the 3-phase shaping signals u, v and w. Also, it is not limited to the logical pulse signals of 6 phases, logical pulse signals of plural phases can be prepared if required.

In the signal forming circuit in the embodiments of this invention, the slant waveform signals and predetermined voltage signals are combined to obtain formed signals as a voltage signal, but it is not limited thereto, the slant waveform signals may be converted into electrical signals and the electrical signals thus obtained and predetermined current signals may be combined to obtain formed signal as an electrical current signal. In addition, even when the formed signals thus formed are not of a perfectly trapezoidal waveform, the trapezoidal waveform position signals can be prepared by the operation of the signal preparing circuit.

Also in the signal preparing circuit in this embodiment, a negative-feedback loop is provided to obtain 3-phase feedback combined signals in response to the first 3-phase formed signals or the second 3-phase formed signals, and by making the 3-phase feedback formed signals constant, the first or second position signals of uniform trapezoidal waveform are prepared.

However, it is not limited thereto, when the first and second formed signals (d1, f1, h1, g1, i1, and e1 in FIG. 10) are of trapezoidal waveform, by shifting the 3-phase formed signals of a predetermined level simply, trapezoidal waveform position signals having the desired angular width can be obtained as well.

Figure 14:
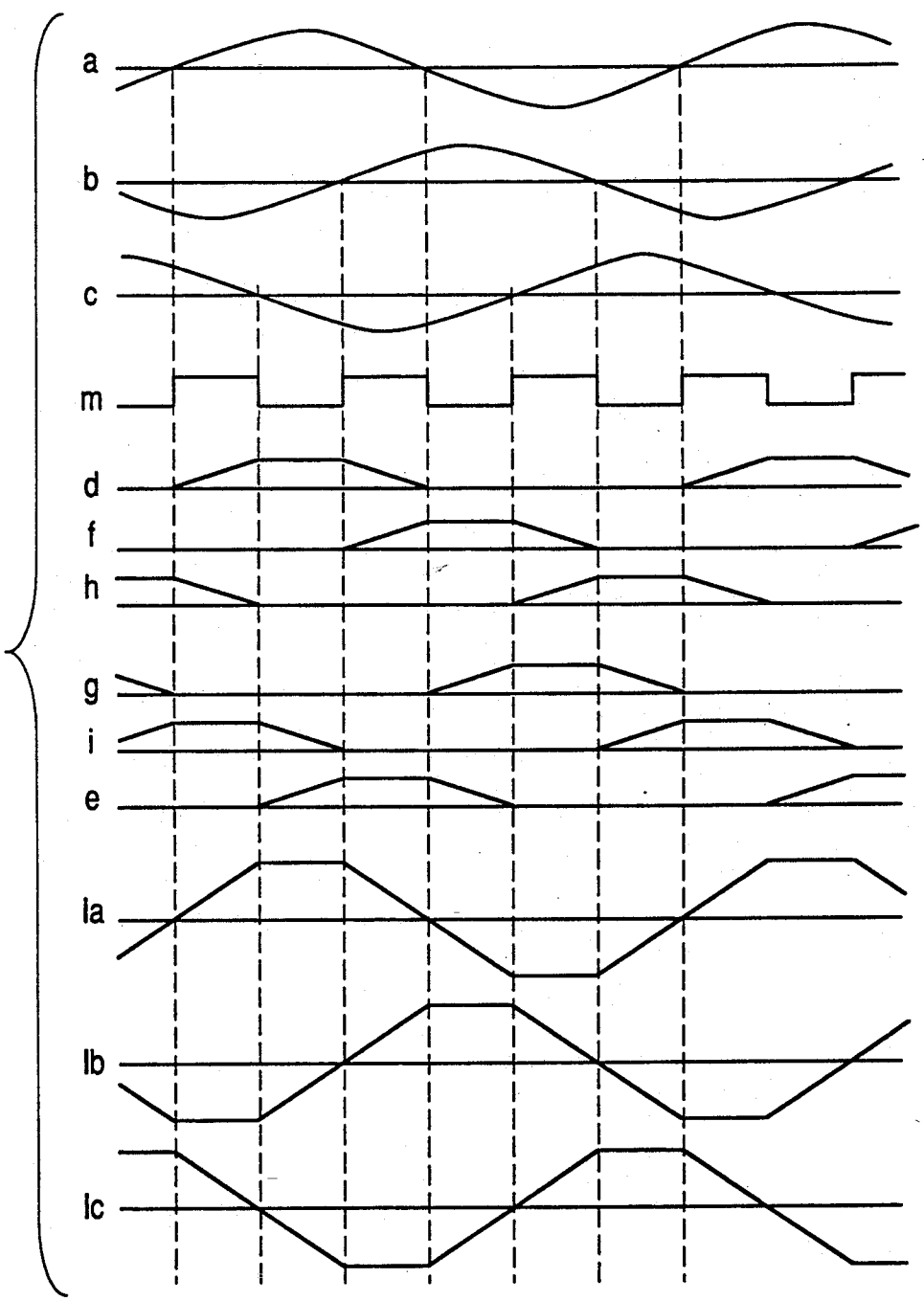

Further in addition, in the signal preparing circuit 6 shown in FIG. 11, by fixing the setting voltages of the constant voltage sources 83a and 83b so as to be zero, when it is operated always using the driving waveform signals (the formed signals d1, f1, h1, g1, i1 and e1 are similar in waveform respectively to the position signals d, f, h, g, i and e) as shown in FIG. 14, the signal preparing circuit 6 is not specially provided, and the formed signals d1, f1, h1, g1, i1 and e1 are inverted respectively into the electric current signals d, f, h, g, i and e by an electric current circuit, and then, these signals d, f, h, g, i and e may be inputted to the power supplying circuit 5 as the position signals. In this case, the signal preparing circuit 6 may be omitted, thus being capable of making the driving circuit simple.

What is claimed is:

1. A sensorless brushless motor comprising:
   three-phase stator windings;
   a counter electromotive force detecting means for generating a shaping signal in response to counter electromotive forces respectively induced in said three-phase stator windings;
   a logical pulse generating means for generating a plurality of pulse signals in response to said shaping signal;
   a waveform generating means for generating slant waveform signals whose slants are started from or substantially from the edge points of said shaping signal;
   a signal forming means for forming six-phase position signals from the pulse signals of said logical pulse generating means and the slant waveform signals of said waveform generating means;
   a first driving transistors group comprising three transistors, which is controllably caused to conduct in response to three-phase position signals out of the six-phase position signals of said signal forming means and forms an electric current loop between on terminal of a direct-current power source and electric current receiving terminals of said stator windings; and
   a second driving transistors group comprising three transistors, which is controllably caused to conduct in response to the other three-phase position signals out of the six-phase position signals of said signal forming means and forms an electrical current loop between another terminal of said direct-current power source and said electric current receiving terminals of said stator windings.

2. A sensorless brushless motor as claimed in claim 1, wherein said waveform generating means includes a means for changing the slant of the slant waveform signals on a time basis in response to the period of a shaping signal generated by said counter electromotive force detecting means.

3. A sensorless brushless motor as claimed in claim 1, wherein said waveform generating means comprises a counter means for repeating counting and resetting of clock signals in response to a shaping signal of said counter electromotive force detecting means; and a digital-analog converter means for converting the content of said counter means into an analog value.

4. A sensorless brushless motor as claimed in claim 3, wherein said waveform generating means includes a means for changing the frequency of a clock signal in response to the period of a shaping signal of said counter electromotive force detecting means.

5. A sensor less brushless motor comprising:
three-phase stator windings;
a counter electrocute force detecting means for generating a shaping signal in response to counter electromotive forces respectively induced in said three-phase stator windings;
a logical pulse generating means for generating a plurality of pulse signals in response to said shaping signal;
a first slant waveform generating means for generating a first slant waveform signal in response to said shaping
a second slant waveform generating means for generating a second slant waveform signal at a different timing fro said first slant waveform signal in response to said shaping signal;
a first position signal forming means for forming first three-phase position signals fro the pulse signals of said logical pulse generating means and the first slant waveform signal of said first slant waveform generating means;
a second position signal forming means for forming second three-phase position signals having different timings from those of said first position signals from the pulse signals of said logical pulse generating means and the second slant waveform signal of said second slant waveform generating means; ·
a first driving transistors group comprising three transistors, which is controllably caused to conduct in response to said first position signals and forms an electric current loop between on terminal of a direct-current power source and electric current receiving terminals of said stator windings; and
a second driving transistors group comprising three transistors, which is controllably caused to conduct in response to said second position signals and forms an electric current loop between another terminal of said direct-current power source and said electric current receiving terminals of said stator windings.

6. A sensorless brushless motor as claimed in claim 5, wherein said first slant waveform generating means or said second slant, waveform generating means includes a means for changing the slant of the first slant waveform signal or second slant waveform signal on a time basis in response to the period of a shaping signal of said counter electromotive force detecting means.

7. A sensorless brushless motor as claimed in claim 5, wherein said first slant waveform generating means or second slant waveform generating means comprises:
a counter means which repeats counting and resetting clock signals in response to a shaping signal of said counter electromotive force detecting means; and
a digital-analog converter means for converting the content of said counter means into an analog value.

8. A sensorless brushless motor as claimed in claim 7, wherein said first slant waveform generating means or said second slant waveform generating means includes a means for changing the frequency of a clock signal in response to the period of a shaping signal of said counter electromotive force detecting means.

9. A sensorless brushless motor comprising:
three-phase stator windings;
a counter electromotive force detecting means for generating a shaping signal in response to counter electromotive forces respectively induced in said three-phase stator windings;
a logical pulse generating means for generating a plurality of pulse signals in response to said shaping signal;
a waveform generating means for generating slant waveform generating means for generating slant waveform signals whose slants are started form or substantially from the edge points of said shaping signal
a signal forming means for forming six-phase formed signals having rising slant portions and falling slant portions whose slants are started from or substantially from the edge points of said shaping signal fro the pulse signals of said logical pulse generating means and the slant waveform signals of said waveform generating means;
a signal preparing means for preparing six-phase trapezoidal waveform position signals respectively in response to said six-phase formed signals;
a first driving transistors group comprising three transistors, which is controllably caused to conduct in response to first three-phase position signals outputted from said signal preparing means and forms an electric current loop between one terminal of a direct-current owner source and electric current receiving terminals of said stator windings; and
a second driving transistors group comprising three transistors which is controllable caused to conduct in response to second three-phase position signals of said signal preparing means and forms an electric current loop between another terminal of said direct-current power source and said electric current receiving terminals of said stator windings.

10. A sensorless brushless motor as claimed in claim 9, wherein said waveform generating means includes a means for changing the slant of a slant waveform signal on a time basis in response to the period of a shaping signal of said counter electromotive force detecting means.

11. A sensorless brushless motor as claimed in claim 9, wherein said waveform generating means comprises:
a counter means for repeating counting and resetting of clock signals in response to a shaping signal of said counter electromotive force detecting means; and
a digital-analog converter means for converting the content of said counter means into an analog value.

12. A sensorless brushless motor as claimed in claim 11, wherein said waveform generating means includes a means for changing the frequency of a clock signal in response to the period of a shaping signal of said counter electromotive force detecting means.

13. A sensorless brushless motor as claimed in claim 9, wherein said signal preparing means includes a first negative-feedback loop means and a second negative-feedback loop means, said first negative-feedback loop means having a means for generating first feedback formed signals from the first three-phase position signals obtained respectively in response to the three-phase formed signals of said signal forming means and a means for causing said first feedback formed signal to coincide with a first command signal, and said second negative-feedback loop means having means for generating second feedback formed signal from the second three-phase position signals obtained respectively in response to the other three-phase formed signals of said signal forming means and a means for causing said second feedback formed signal to coincide with a second command signal.

14. A sensorless brushless motor comprising:
    three-phase stator windings;
    a counter electromotive force detecting means for generating a shaping signal in response to counter electromotive forces respectively induced in said stator windings;
    a logical pulse generating means for generating a plurality of pulse signals in response to aid shaping signal;
    a first slant waveform generating means for generating a first slant waveform signal in response to said shaping signal;
    a second slant waveform generating means for generating a second slant waveform signal at a different timing from said shaping signal;
    a first formed signal forming means for generating first three-phase formed signals fro the pulse signals of said logical pulse generating means and the first slant waveform signal of said first slant waveform generating means in such a conduction that the rising and falling slant portions of said first three-phase formed signals are stared at a timing equal or substantially equal to that of said first slant waveform signal;
    a second formed signal forming means for generating second three-phase formed signals from the pulse signals of said logical pulse generating means and the second slant waveform signal of said second slant waveform generating means in such a condition that the rising and falling slant portions of said second three-phase formed signals are started at a timing equal or substantially equal to that of said second slant waveform signal;
    a first portion signal preparing means for preparing first three-phase position signals of a trapezoidal waveform respectively in response to said first three-phase formed signals;
    a second position signal preparing means for preparing second three-phase position signals of a trapezoidal waveform respectively in response to said second three-phase formed signals;
    a first driving transistors group comprising three transistors, which is controllably caused to conduct in response to said first three-phase position signals and forms an electric current loop between one terminal of a direct-current power source and electric current receiving terminals of said stator windings; and
    a second driving transistors group comprising three transistors, which is controllably caused to conduct in response to said second three-phase position signals and forms an electric current loop between another terminal of said direct-current power source and said electric current receiving terminals of said stator windings.

15. A sensorless brushless motor as claimed in claim 14, wherein said first slant waveform generating means or said second slant waveform generating means comprises:
    a counter means for repeating counting and resetting of clock signals in response to a shaping signal of said counter electromotive force detecting means; and
    a digital-analog converter means for converting the content of said counter means into an analog value.

16. A sensorless brushless motor as claimed in claim 15, wherein said first slant waveform generating means or said second slant waveform generating means includes a means for changing the frequency of a clock signal in response to the period of a shaping signal of said counter electromotive force detecting means.

17. A sensor less brushless motor as claimed in claim 14, wherein said first position signal preparing means includes a negative-feedback loop means having a means for generating a feedback formed signal from the first three-phase position signals obtained respectively in response to the first three-phase formed signals of said first formed signal forming means and a means for causing said feedback formed signal to coincide with a command signal.

18. a sensorless brushless motor as claimed in claim 14, wherein said second position preparing means includes a negative-feedback loop means having a means for generating a feedback formed signal from the second three-phase position signals obtained respectively in response to the second three-phase formed signals of said second formed signal forming means and a means for causing said feedback formed signal to coincide with a command signal.

* * * * *